United States Patent
Ridder et al.

(10) Patent No.: US 7,889,349 B2
(45) Date of Patent: Feb. 15, 2011

(54) METHOD AND APPARATUS FOR IMPROVEMENT OF SPECTROMETER STABILITY, AND MULTIVARIATE CALIBRATION TRANSFER

(75) Inventors: Trent Ridder, Woodbridge, VA (US);
Ben ver Steeg, Redlands, CA (US);
Michael Haass, Albuquerque, NM (US);
John D. Maynard, Albuquerque, NM (US); Zachary Benz, Albuquerque, NM (US)

(73) Assignee: TruTouch Technologies, Inc., Albuquerque, NM (US)

( * ) Notice: Subject to any disclaimer, the term of this patent is extended or adjusted under 35 U.S.C. 154(b) by 256 days.

(21) Appl. No.: 11/560,362

(22) Filed: Nov. 16, 2006

(65) Prior Publication Data

US 2008/0117405 A1      May 22, 2008

(51) Int. Cl.
*G01B 9/02*      (2006.01)
*G01J 3/45*      (2006.01)
(52) U.S. Cl. .................................................. 356/451
(58) Field of Classification Search ................. 356/451, 356/452, 455
See application file for complete search history.

(56) References Cited

U.S. PATENT DOCUMENTS

| | | | |
|---|---|---|---|
| 5,638,816 A | 6/1997 | Kiani-Azarbayiany et al. | |
| 5,696,582 A * | 12/1997 | Barwald et al. | 356/451 |
| 5,743,262 A | 4/1998 | Lepper et al. | |
| 5,835,213 A * | 11/1998 | Curbelo | 356/451 |
| 5,860,919 A | 1/1999 | Kiani-Azarbayiany et al. | |
| 5,914,780 A | 6/1999 | Turner et al. | |
| 5,923,422 A | 7/1999 | Keens et al. | |
| 5,963,322 A | 10/1999 | Rapp et al. | |
| 6,110,522 A | 8/2000 | Lepper et al. | |
| 6,151,516 A | 11/2000 | Kiani-Azarbayiany et al. | |
| 6,559,947 B1 | 5/2003 | Turner | |
| 6,574,490 B2 | 6/2003 | Abbink et al. | |
| 6,865,408 B1 | 3/2005 | Abbink et al. | |
| 6,931,268 B1 | 8/2005 | Kiani-Azarbayiany et al. | |
| 7,043,288 B2 | 5/2006 | Davis, III et al. | |

OTHER PUBLICATIONS

Brault, [0001] "*New approach to high-precision Fourier transform spectrometer design*"; Applied Optics vol. 35 No. 16, 1996, pp. 2891.
Brasunas and Cushman, Uniform time-sampling Fourier transform spectroscopy, Applied Optics vol. 36 No. 10, 1997, pp. 2206.

* cited by examiner

*Primary Examiner*—Michael A Lyons
(74) *Attorney, Agent, or Firm*—V. Gerald Grafe

(57) ABSTRACT

The present invention provides improved methods and apparatuses for accurate measurements using interferometers. A functional relationship between the optical path difference and time is determined from a reference signal from an interferometer. The times at which the interferometer had specific optical path differences can be determined from the functional relationship. Those times can then be used to select times at which the spectroscopic signal from the interferometer was produced at the specific optical path differences. The invention can be applied, as examples, to maintain instrument calibration, and to transfer or compare calibrations or measurements across different interferometers.

27 Claims, 21 Drawing Sheets

METHOD AND APPARATUS FOR IMPROVEMENT OF SPECTROMETER STABILITY, AND MULTIVARIATE CALIBRATION TRANSFER

TECHNICAL FIELD

The present invention generally relates to the field of spectroscopy and in particular relates to spectroscopic devices incorporating interferometers.

BACKGROUND OF THE INVENTION

Spectroscopic measurements have been widely applied to address many different purposes such as medical diagnostics, industrial process control and forensic measurements. In many of these applications the sample of interest is brought to a laboratory or clinical facility where the spectrometer is located. This allows one spectrometer to measure samples acquired in multiple locations. Recently, the evolution of spectroscopic instrumentation has given rise to the desire to measure samples from multiple locations simultaneously without transporting them to a dedicated facility. This is particularly important in applications such as in vivo medical or forensic tests where transporting the subject to a measurement facility may not be feasible or in process control where real-time measurements are critical and the delays caused by sample transportation are not acceptable. As such, these applications can require multiple spectroscopic devices at one or more locations.

There are two significant consequences of the transition of spectroscopic devices away from the laboratory and to the location of the sample that are related to the present invention. First, the location of the sample is typically an environment that has a large range of potential perturbations (e.g. vibrations of a factory floor, temperature range for outdoor measurements) relative to the carefully controlled conditions typically observed in a laboratory or clinical facility. Second, when multiple spectroscopic devices are located in one or more facilities, the range of environmental conditions can vary significantly between the sites. Consequently, any type of spectroscopic device deployed in such conditions must be designed to mitigate or compensate for environmental disturbances that have been largely limited in laboratory applications of spectroscopy.

The present invention is related to the mitigation of environmental disturbances of spectroscopic devices (spectrometers) incorporating interferometers and compensating for differences between such spectroscopic devices deployed to one or more locations. Some common examples of spectrometers that can incorporate interferometers are visible, NIR, and IR absorption spectrometers; visible: NIR, and IR emission spectrometers; and Raman spectrometers. One skilled in the art recognizes that other applications of interferometric spectroscopy exist that could benefit from the present invention. There are many different types of interferometer designs and architectures recognized in the art that could benefit from the present invention. Some examples include Michelson, Mach-Zehnder, and refractive interferometers. For demonstrative purposes the remainder of this disclosure will discuss embodiments of Fourier Transform Near infrared (FT-NIR) spectrometers using a Michelson geometry interferometer and is not intended to limit the scope of the present invention.

SUMMARY OF THE INVENTION

In interferometry, measurements are acquired such that different wavelengths of light are modulated in time to unique frequencies. Most interferometers modulate the incident light by inducing a difference in the lengths of the optical paths in the two "legs" of the interferometer's optical design (sometimes called OPD or "optical path difference" or "optical path length difference"). Typically changes in OPO are effected by a moving (e.g. translating or rotating) optical component. The intensity of light is then recorded for a range of optical path differences in order to create an interferogram, which implies that the location of the moving optical component must be both controlled and known.

The required precision of the control depends on the wavelength range of a particular measurement (e.g. shorter wavelengths require more precise control), but in all cases practical interferometry requires knowledge of the location of the moving optical component to within a fraction of the shortest wavelength of interest. In some applications the near-infrared region, the location of the moving optical component must be known to and accuracy better than 100 picometers ($10^{-10}$ meters) throughout the entire range of induced OPD's. The mechanical design and components of practical spectrometers is rarely conducive to such precise control of the moving optical component, Consequently, a dedicated reference for the location of the moving optical component is often included in the spectrometer.

Typically the reference is a monochromatic, or effectively monochromatic, light source, such as a Helium-Neon (HeNe) laser, whose interferogram is often measured on a distinct optical detector. As the light is monochromatic, the interference pattern of the reference during a linear change on OPD over time takes the form of a cosine wave where each zero crossing corresponds to ½ the wavelength of the reference (632.8/2 or 316.4 nm for a HeNe). Thus, the zero crossings are detected throughout the range of induced optical path difference in order to provide a map of the location of the moving optical component over time.

In some cases, a polychromatic or monochromatic light source can be considered "effectively monochromatic" for a given interferometric device and thus be suitable for use as a reference light source. In some embodiments the objective is to measure the zero crossings (or other parts) of the reference signal which is ideally a perfect cosine wave. One skilled in the art recognizes that polychromatic light sources and non-ideally collimated or aligned reference light sources can cause the reference signal to deviate from a perfect cosine wave yet still serve as a suitable reference signal. The degree of tolerable deviation depends, in part, on the wavelength distribution of the light source, the optical design of the interferometric device, the optical resolution of the interferometric device, and the overall photometric accuracy requirements of the interferogram. These parameters combine to determine what is considered "effectively monochromatic" for a given interferometric device or application. As an example, low resolution interferometric devices (devices with smaller ranges of measured OPD's) are, in general, more tolerant of non-ideal reference signals. For example, a multi-mode diode laser could be used as a reference light source in some low resolution interferometric applications. Other light sources, such as vertical cavity surface emitting lasers (VCSEL's), diode lasers, other solid-state lasers, multi-mode lasers, single mode lasers, or polychromatic light sources (filtered or unfiltered) can be useful reference light sources depending on the application of interest. One skilled in the art that the requirements of the interferometer reference signal can vary significantly, but that the present invention is equally applicable to interferometric devices incorporating monochromatic or effectively monochromatic reference light sources.

In most interferometers, the map obtained from the reference signal serves two theoretical purposes, First, it allows mitigation of environmental influences (e.g. vibrations) on the interferometer as the reference map ideally provides an indication of the location of the moving optical component even in the presence of physical perturbations, Second, the zero crossings of the reference signal provide a convenient means for sampling the measured interferogram at equal intervals of OPD, which is a requirement of many mathematical transforms (e.g. the Fourier Transform) that are used to convert the measured interferograms into spectra. Many applications of interferometric spectroscopy effectively unify these two purposes; however, the present invention demonstrates that there can be significant advantages when they are considered separately.

The effectiveness of the reference (also referred to as the "reference light" or "reference channel" or "reference signal" or "reference radiation" or "reference photons") for both of the above objectives is dependent upon the physical alignment of the reference with respect to the incident light of interest (referred to as the "spectroscopic light" or "spectroscopic channel" or "spectroscopic signal" or "spectroscopic radiation" or "spectroscopic photons") and the design of the analog and digital electronics used to measure both the incident light and the monochromatic reference. Misalignment of the reference relative to the incident light of interest can result in an inaccurate map of the location of the moving optical component as the measured wavelength of the reference will deviate from its true wavelength. This type of error results in a wavelength shift in the measured spectrum of the incident light relative to its true spectrum. As different spectrometers can each exhibit different degrees of misalignment, it is possible to have spectrometer specific wavelength shifts that can greatly confound quantitative or qualitative analysis of spectroscopic data acquired from multiple devices or locations. Thus, it is highly desirable to standardize the wavelength axes of all spectrometers used for a given application in order to mitigate this concern.

Another aspect of the present invention is that multiple spectroscopic devices can incorporate references with different wavelengths. For example, in interferometers incorporating vertical cavity surface emitting lasers (VCSEL) as references, each VCSEL can have a substantially different lasing wavelength. Application of the reference signal in a typical fashion (e.g. the reference zero crossings are used for both purposes described above) can result in significant differences between the spectra acquired from each instrument even in situations where the VCSEL's are perfectly aligned in their respective interferometers and their lasing wavelengths are precisely known. The present invention provides a method of standardizing the interferograms, and therefore spectra, obtained from multiple interferometric spectrometers that is applicable to the correction of misaligned references, references of different wavelengths, or combinations thereof.

Another concern is that the analog and digital electronics used to measure the incident light and reference signal are rarely equivalent either within a single interferometric spectrometer or between multiple devices. Typically, the light levels and wavelength content of the channels differ and therefore require distinct analog and/or digital filtering and amplification steps in the process of measuring interferograms. As all analog circuits and digital filters have a finite frequency response, the differences between the spectroscopic and reference channels (as well as difference between the channels across instruments) are particularly important as the two circuits will have distinct frequency responses. Thus, for the case of differences between the reference and spectroscopic channel, the reference signal (and any underlying map of OPD versus time) will be distorted by the finite frequency response of any analog circuit or applied digital filters. Furthermore, the spectroscopic signal will be distorted by its associated analog circuits and digital filters thus impairing the effectiveness of the reference signal for the purposes of tracking the location of the moving optical component as well as sampling the spectroscopic interferogram. In order to mitigate this type of error, the frequency responses of the reference and spectroscopic signals must be measured and compensated in order to remove the induced distortions prior to determining the final interferograms.

Of particular importance to the present invention was the application of constant time sampling of the interferogram and reference signals in the early 1990's when delta-sigma analog to digital converters (ADC's) became routinely available due to their widespread use in the audio industry. In New approach to high-precision Fourier transform spectrometer design", Applied Optics Vol, 35 No. 16, 1996, pp. 2891, Brault outlined the critical steps required to effectively implement constant-time sampling ADC's in interferometry in order to leverage their unique advantages relative to the historically applied triggered ADC's (collectively referred to as the "Brault Method" in the art). The recognized advantages were high dynamic range, signal to noise, excellent intermodulation suppression, significant easing of velocity control requirements, and the ability to implement adaptive digital filters in order to compensate for the nonlinear frequency responses of the spectroscopic and reference channels. However, the embodiments discussed were typically applied to a unique spectroscopic device where the complications associated with efficient implementation in multiple devices (possibly hundreds or thousands) located in different environments were not considered. As such, significant time and expertise could be applied to the characterization and preparation of the unique device that might not be feasible in a commercially deployed spectroscopic device. The present invention builds upon the Brault method and in particular introduces novel methods for its commercial implementation.

In U.S. Pat. No. 5,914,780 titled "Digitization of interferograms in Fourier Transform Spectroscopy", Turner et al disclose the Brault method for recording digitized interferograms from Michelson interferometers. Turner discloses the same advantages of high dynamic range, signal to noise, excellent intermodulation suppression, and significant easing of velocity control requirements. Turner does not discuss the utility of constant time sampling for non-Michelson interferometers. Turner does not discuss the problems of wavenumber standardization or compensation of nonlinear phase errors between the incident and reference signals due to differences in their electronic circuits.

In U.S. Pat. No. 5,963,322 titled "Optical Spectrometer and Method of implementing Optical Spectroscopy", Rapp et al provide a concise summary of the Brault method. Rapp also discloses the previously unrecognized advantage that constant time sampling of signals allows the use of a switching power supply to drive the moving optical component without the need for galvanic separation from other power sources. In contrast, when using constant position sampling an isolated linear power supply (more expensive) was typically required.

In "Uniform time-sampling Fourier transform spectroscopy", Applied Optics Vol. 36 No. 10, 1997, pp. 2206, Brasunas and Cushman expands upon the Brault method through the use of constant time sampling ADC's to perform fringe multiplication of the reference signal. The purpose of this multiplication is to extend the free spectral range of the measured spectrum by increasing the Nyquist limit that would otherwise be imposed be the wavelength of the reference laser. As most reference signals are obtained from a HeNe laser (632.8 nm), the primary application of the fringe multiplication was visible interferometry (300-700 nm) where the wavelength of the HeNe laser was too short to prevent spectral folding under standard interferometric processing schemes. The basic premise was that the HeNe laser was suitable to establish the "map" of OPD versus time and that the map could in turn be interpolated at any point between HeNe zero crossings as long as all sources of OPD perturbation had frequencies less than ½ that of the zero-crossing rate, The present invention takes advantage of this fad by applying it to the wavenumber standardization of spectra acquired from multiple instruments that could have references with different wavenumbers which was not recognized by Brasunas and Cushman.

In U.S. Pat. No. 5,923,422 titled "Method for Obtaining an Optical FT Spectrum", Keens et al discuss a method for determining a compensation filter for application as described in the Brault method. The method involves acquisition of interferograms from corresponding to each direction of the moving optical component, computing the mean of their phase functions, fitting a transfer function model to the mean phase function, and calculating the compensation filter as the inverse of the transfer function. The present invention simplifies this process by eliminating the need to fit a transfer function model by computing the discrete compensation filter directly from the phase difference between the collected interferograms. Furthermore, the method for computing the compensation filter of the present invention is inherently results in stable, real filter coefficients that are advantageous.

Other applications of constant time sampling and delta-sigma ADC's in spectroscopy are known in the art. In related U.S. Pat. Nos. 5,638,816, 5,860,919, 6,151,516, and 6,931,268B1 collectively titled "Active Pulse Blood Constituent Monitoring", Kiani-Azarbayjany et al. discuss embodiments of noninvasive blood glucose monitors that induce changes in the blood pulse within human tissue. Some of the embodiments disclose the use of a single channel delta-sigma analog to digital converter (one type of constant-time sampling analog to digital converter relevant to the present invention) due to its low-cost and low-noise characteristics. None of the patents involve interferometry nor do they discuss the stability and standardization advantages of constant-time sampling ADC's in spectrometers incorporating interferometers, In related U.S. Pat. Nos. 5,743,262 and 6,110,522 collectively titled "Blood Glucose Monitoring System", Lepper et al. disclose embodiments of noninvasive glucose monitors involving specialized optical filters. Some of the embodiments disclose the use of a single channel delta-sigma analog to digital converter (one type of constant-time sampling analog to digital converter relevant to the present invention) due to its low-cost and low-noise characteristics. None of the patents involve interferometry nor do they discuss the stability and standardization advantages of constant-time sampling ADC's in spectrometers incorporating interferometers.

In related U.S. Pat. Nos. 6,574,490 and 6,865,408 collectively titled "System for Non-invasive measurement of glucose in humans", Abbink et al disclose embodiments of noninvasive glucose monitors based on Fourier Transform Near infrared (FT-NIR) spectroscopy using interferometers. The patents discuss the signal to noise and dynamic range advantages of delta-sigma analog to digital converters for measurements of glucose in humans. The patents do not discuss the vibrational stability and standardization advantages of constant-time sampling ADC's in spectrometers incorporating interferometers.

In U.S. Pat. No. 7,043,288 B2 titled "Apparatus and Method for Spectroscopic Analysis of Tissue to Detect Diabetes in an Individual", Davis et al disclose embodiments of noninvasive diabetes screening devices based on spectroscopy. While the patent discusses the signal to noise and dynamic range advantages of delta-sigma analog to digital converters in interferometry, it does not discuss the vibrational stability and standardization advantages of constant-time sampling ADC's.

In U.S. Pat. No. 6,559,947 titled "Reference Fringe Counting Fourier Transform Spectroscopy", Turner describes embodiments for detecting a change in scanning direction of a Michelson geometry interferometer. Some of the disclosed embodiments use a delta-sigma analog to digital converter. The patent does not discuss the vibrational stability and standardization advantages of constant-time sampling ADC's in spectrometers incorporating interferometers nor does the present invention involve detecting changes in scan direction using digitized signals.

Advantages and novel features will become apparent to those skilled in the art upon examination of the following description or can be learned by practice of the invention. The advantages of the invention can be realized and attained by means of the instrumentalities and combinations particularly pointed out in the appended claims.

DETAILED DESCRIPTION OF THE INVENTION

Spectroscopic measurements have been widely applied to address many different purposes such as medical diagnostics, industrial process control, and forensic measurements. In many of these applications the sample of interest is brought to a laboratory or clinical facility where the spectrometer is located. This allows one spectrometer to measure samples acquired in multiple locations. Recently, the evolution of spectroscopic instrumentation has given rise to the desire to measure samples from multiple locations simultaneously without transporting them to a dedicated facility. This is particularly important in applications such as in vivo medical or forensic tests where transporting the subject to a measurement facility may not be feasible or in process control where realtime measurements are critical and the delays caused by sample transportation are not acceptable. As such, these applications can require multiple spectroscopic devices at one or more locations which introduce the potential for the different device environments and properties to adversely influence the measurements as well as the consistency of measurements across the devices.

Several fundamental approaches to spectroscopic device design are known in the art. Some examples are based upon dispersive spectrometers (e.g. those employing a diffraction grating or prism), interferometric spectrometers (e.g. Michelson and Fabry Perot interferometers), and solid-state spectrometers (e.g. tunable LED's, or arrays of LED's). The present invention is principally related to interferometric spectrometers, as such a brief description of the fundamental basis of interferometric measurements is required. One skilled in the art will recognize that many types of interferometers will benefit form the present invention. For demonstrative purposes, a Michelson interferometer will be discussed and is not intended to limit the scope of the present invention.

Figure 1:
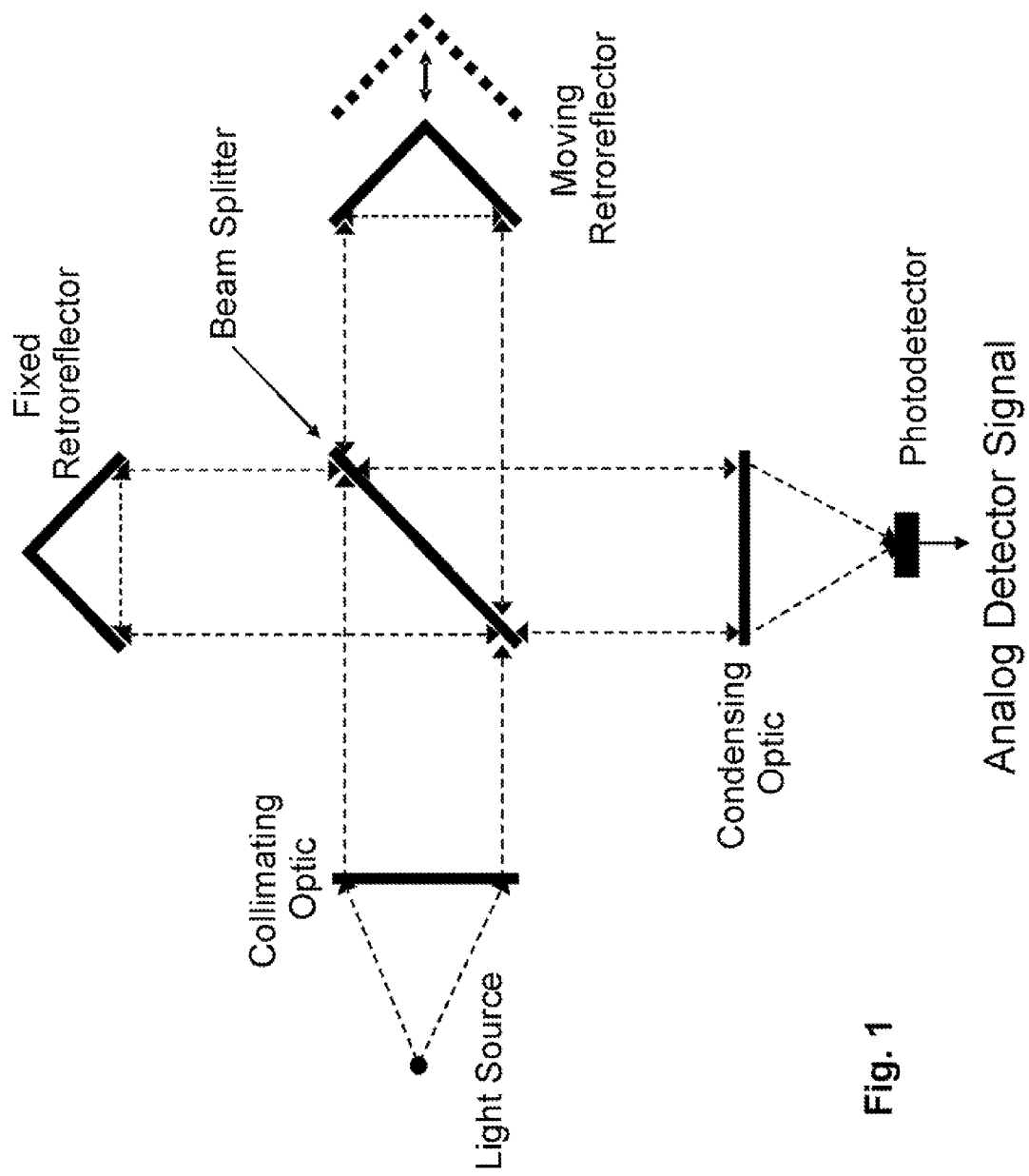
FIG. 1 is a schematic diagram of a Michelson interferometer.

Now referring to FIG. 1, a Michelson interferometer can be considered to be comprised of an input source of light, a collimating lens, a beam splitter, a fixed retroreflector, a moving retroreflector, a condensing lens, and a photodetector. The input source of light can be light collected from an emitting blackbody such as a filament lamp or the light obtained from a sample under spectroscopic investigation (e.g. light collected from a sample and routed to the interferometer). In some embodiments incorporating interferometers, the sample under investigation can be placed between the condensing lens and the photodetector using appropriate optical components. Regardless, the objective of the interferometer is to measure the spectrum (typically intensity as a function of wavelength or wavenumber) of the input source of light and thus can also be referred to as the spectroscopic light, signal, or channel.

The collimating optic collects light from the source and directs a collimated beam to the beam splitter. In FIG. 1, the collimating optic is a lens that transmits light, other embodiments can use reflective optics such as concave mirrors. The collimating optic can incorporate coatings or materials designed block or attenuate undesirable wavelengths. The beam splitter then divides the collimated beam and directs the resulting beams into different "legs" of the interferometer. The beam splitter is typically a transmissive, flat substrate (e.g. fused silica) with a coating on one surface that transmits a portion of the incident beam while reflecting another portion. In general, the coating facilitates the splitting of the incident beam. In some embodiments of Michelson interferometers, one of the legs includes a compensating optic of the same substrate material and thickness of the beam splitter, but with no coating. The compensating optic is intended to account for, and correct, the effect of the beam splitter substrate on the collimated beam.

The first leg of the interferometer incorporates a fixed (e.g. stationary) retroreflector that reflects the incident light back to the beams splitter. In FIG. 1, the fixed retroreflector is a cube corner mirror which offers enhanced stability and eased alignment tolerances relative to flat mirrors. Combinations of mirrors and other optical components can collectively be used to form a retroreflector. The second leg of the interferometer contains a moving retroreflector. Typically the moving retroreflector is of the same design as the fixed retroreflector although this is not required. As its name implies, the moving retroreflector is translated or rotated in a controlled fashion. As with the $1^{st}$ leg, the incident light is reflected back to the beam splitter.

In most Michelson interferometers (as in FIG. 1) the beam splitter and fixed mirror are rigidly mounted. As such the physical distance between them is constant. However, as the moving retroreflector is translated, the pathlength to the beam splitter in the second leg of the interferometer changes. Consequently, a difference in the pathlength between the two legs of the interferometer is created, which is called the "optical path difference", "optical path length difference" or "OPD". When the moving retroreflector is located such that its distance to the beam splitter is the same as the fixed retroreflector, the OPD is zero and is referred to as the location of "zero path differences", "zero path length difference" or "ZPD".

A "scan" of the interferometer is defined as a single pass through the total travel of the moving optic over the desired range of OPD's. The specific range of OPO's that define a scan depends on the desired optical resolution of the spectrum (resolution improves as OPD increases), and whether OPD's on both sides of ZPD are desired (the moving retroreflector can have distances both shorter and larger than the fixed retroreflector). Furthermore, in the case of a translating moving mirror, scans can be acquired in both directions of moving mirror travel (e.g. "forward" and "reverse" scans). The rate at which the optical path difference changes (related to the moving retroreflector rate of travel) is referred to as the "optical velocity".

Figure 2:
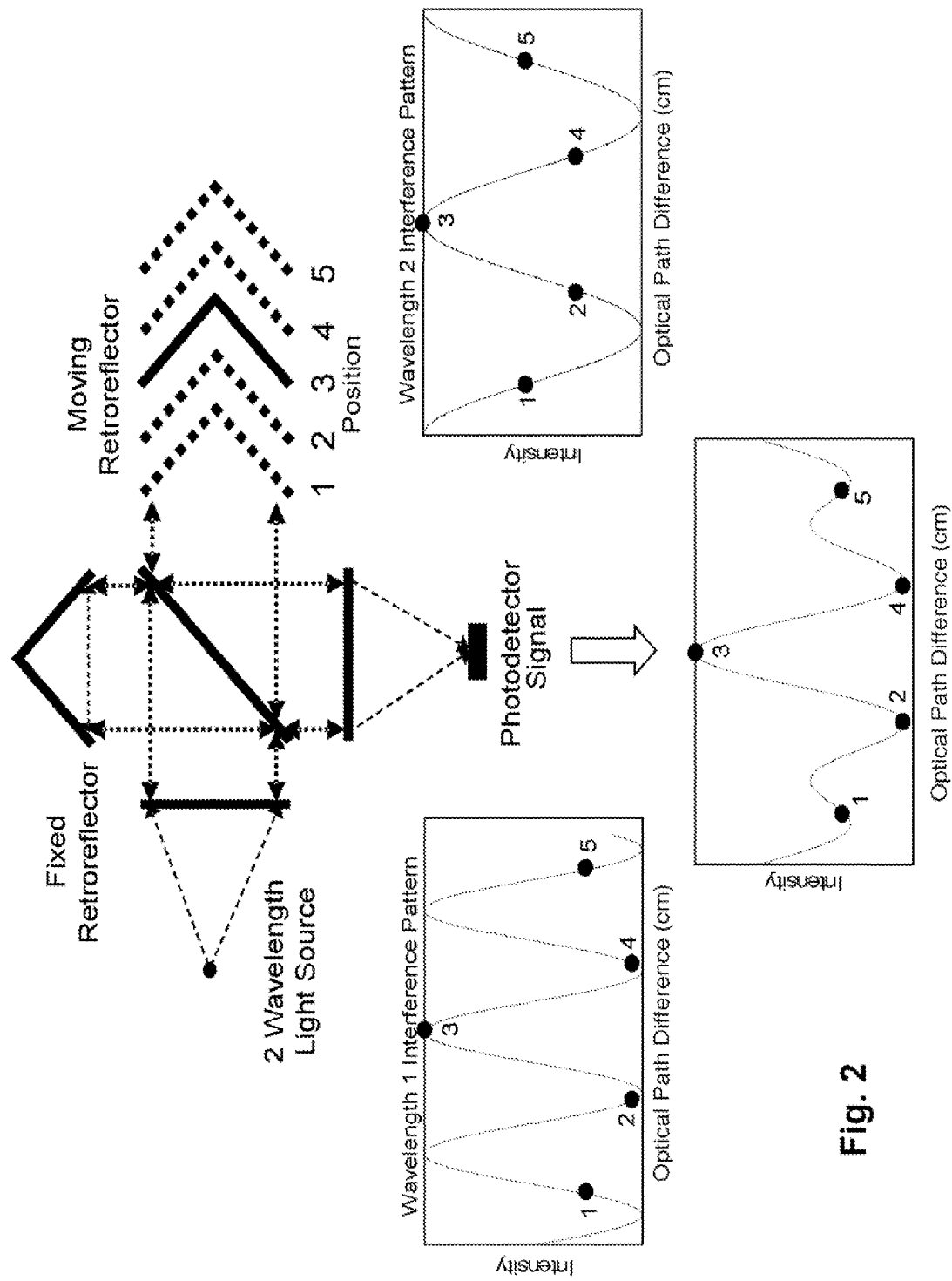
FIG. 2 is a schematic diagram of the interference patterns for two wavelengths of light.

The reflected beams from the two legs of the interferometer recombine at the beam splitter at which point a portion of the light is transmitted back to the light source and another is reflected to the photo detector. The recombination is subject to optical interference that depends upon the optical path difference (the location of the moving retroreflector relative to the fixed retroreflector) and the specific wavelengths of light present in the beam. FIG. 2 shows a diagram of the individual interference pattern for two different wavelengths of light as a function of OPD in an Michelson interferometer that shows that the patterns are cosine functions whose frequency is dependent on the specific wavelength of the light and the optical velocity as governed by equation 1.

$$f_\sigma = 2v\sigma \quad (1)$$

where $f_\sigma$ is the frequency in Hertz observed for $\sigma$ wavenumber light (in $cm^{-1}$) and v is the velocity of the moving optical component in cm/s. Equation 1 indicates that each wavelength of light (expressed in units of wavenumbers) is modulated to a unique frequency by the interferometer. Indeed it is this principal that enables interferometers to measure many wavelengths simultaneously, which is referred to as the multiplex advantage relative to spectroscopic devices that measure one wavelength at a time.

The photodetector generates an analog electrical signal (either current or voltage depending on the detector) proportional to the incident photon flux at a given OPD (ideally the sum of the cosine waves of all wavelengths present in the spectroscopic light). This sum as a function of OPD is referred to as an "interferogram". FIG. 2 shows the interferogram that would be observed for the simple case of incident light comprised of only 2 wavelengths described above.

In practice, a photodetector can be more efficient at detecting some wavelengths of light than others regardless of the frequency that the light is modulated to by the interferormeter (via equation 1). This is referred to as the wavelength response of the detector and can be expressed in a variety of units and ways that depend on the specific type of detector. Regardless, the response is rarely uniform within a device and can vary significantly between devices due to difference in their respective detectors. Many methods for compensating for standardizing or compensating for non uniform wavelength response are known in the art. This class of error is distinct from the concepts disclosed in the present invention as wavelength response errors depend solely on the wavelength distribution of the spectroscopic light while the compensation methods disclosed herein depend on their modulated frequencies and subsequent distortion by signal processing steps.

As the paramount objective of many spectroscopic devices incorporating interferometers is to accurately measure the spectrum of a sample in terms of intensity (or absorbance) as a function of wavelength, interferograms can be of limited practical value. Consequently, the optical information in the interferogram must be transformed via a Fourier or other suitable transform in order to obtain the desired spectrum. These transforms typically require that the interferogram intensity is represented as a linear function of OPD measured at a constant interval. Without additional efforts practical interferometers do not meet this requirement for several reasons, each of which must be addressed before the desired spectrum can be obtained.

In practice, the interferogram is acquired over a finite range of time as the moving retroreflector must physically travel at a finite velocity. Consequently, the photodetector signal is a function of time (frequency) rather than the desired OPD as suggested by equation 1. Ideally the moving retroreflector would have a constant velocity throughout each scan thereby resulting in the photodetector intensity being a linear function of both time and OPD. However, all practical interterormeters are subject to non-idealities and disturbances such as those caused by internal and environmental vibrational influences and analog electronics (including the photodetector itself that have imperfect frequency responses that distort the signal.

In order to mitigate the potential for vibrational effects to adversely influence the measurement, many interferometers incorporate a reference signal to provide an independent measurement of the optical path difference as a function of time during a scan of the interferometer. Typically, the reference signal is obtained from a monochromatic light source such as a Helium-Neon (HeNe) laser that is aligned with respect to the interferometer such that its beam is parallel, but spatially separated, from the tight collected from the light source in FIG. 1. One skilled in the art recognizes that alternative optical implementations of the reference signal are possible, such as a distinct reference interferometer that shares only the moving retroreflector with the spectroscopic interferometer. Regardless of the specific implementation, the light from the reference laser is subject to the same interference phenomenon as the so spectroscopic light discussed in FIG. 1. However, as the light from the reference laser is spatially separated from the spectroscopic tight, it is recorded by its own photodetector (referred to as the "reference" photodetector).

Figure 3:
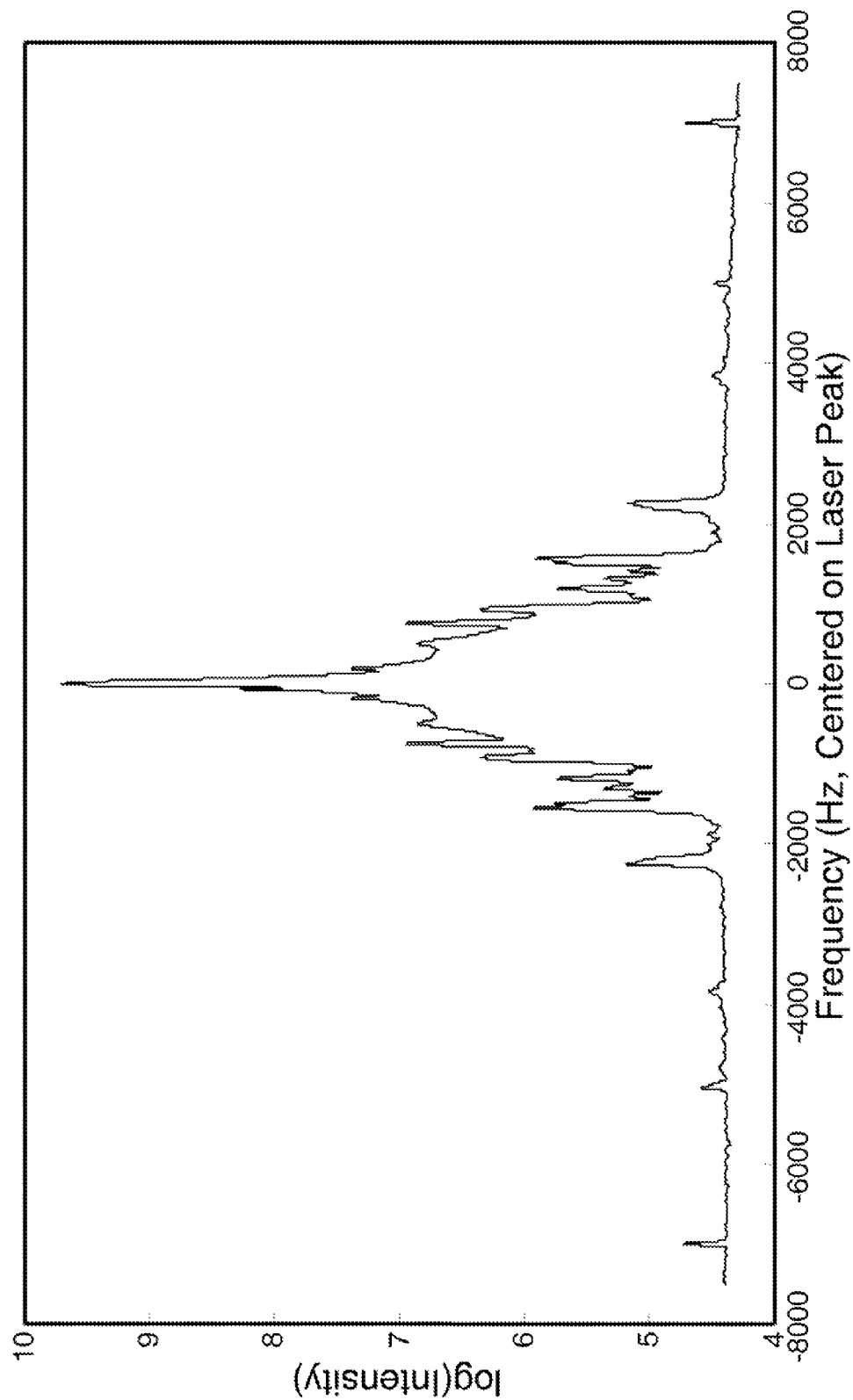
FIG. 3 is a schematic depiction of the power spectral density of a reference signal.

Under perfect velocity control, the interference pattern of the monochromatic laser recorded by the reference photodetector would take the form of a perfect cosine wave (e.g. a constant frequency throughout the scan). The power spectral density of the photodetector signal would exhibit a single, infinitely narrow peak at the frequency specified in equation 1 where $\sigma$ is the known optical wavenumber of the reference. However, as with the spectroscopic signal, the measured reference signal will contain distortions caused by imperfect velocity control of the moving retroreflector caused by vibrations or other perturbations. As an example of the distortions, FIG. 3 shows the power spectral density of the reference signal obtained from a Michelson interferometer in a controlled laboratory that incorporated a Helium Neon laser reference and a servo control system designed to deliver a constant velocity. Despite servo control, FIG. 3 indicates that significant signal was observed at many frequencies despite the fact that monochromatic wavelength of light was present.

The power spectral density in FIG. 3 is symmetrically structured around a primary peak and exhibits many pronounced side peaks. The primary peak corresponds to frequency specified by equation 1 where v is the average velocity observed during the scan. The location of the specific side peaks correspond to the frequencies of the vibrations perturbing the instrument in the laboratory. FIG. 3 demonstrates two concepts. First, perfectly linear velocity is difficult to achieve despite careful design and a controlled laboratory environment. Second, the reference signal contains a record of the frequencies and corresponding magnitudes of velocity perturbations.

Figure 4:
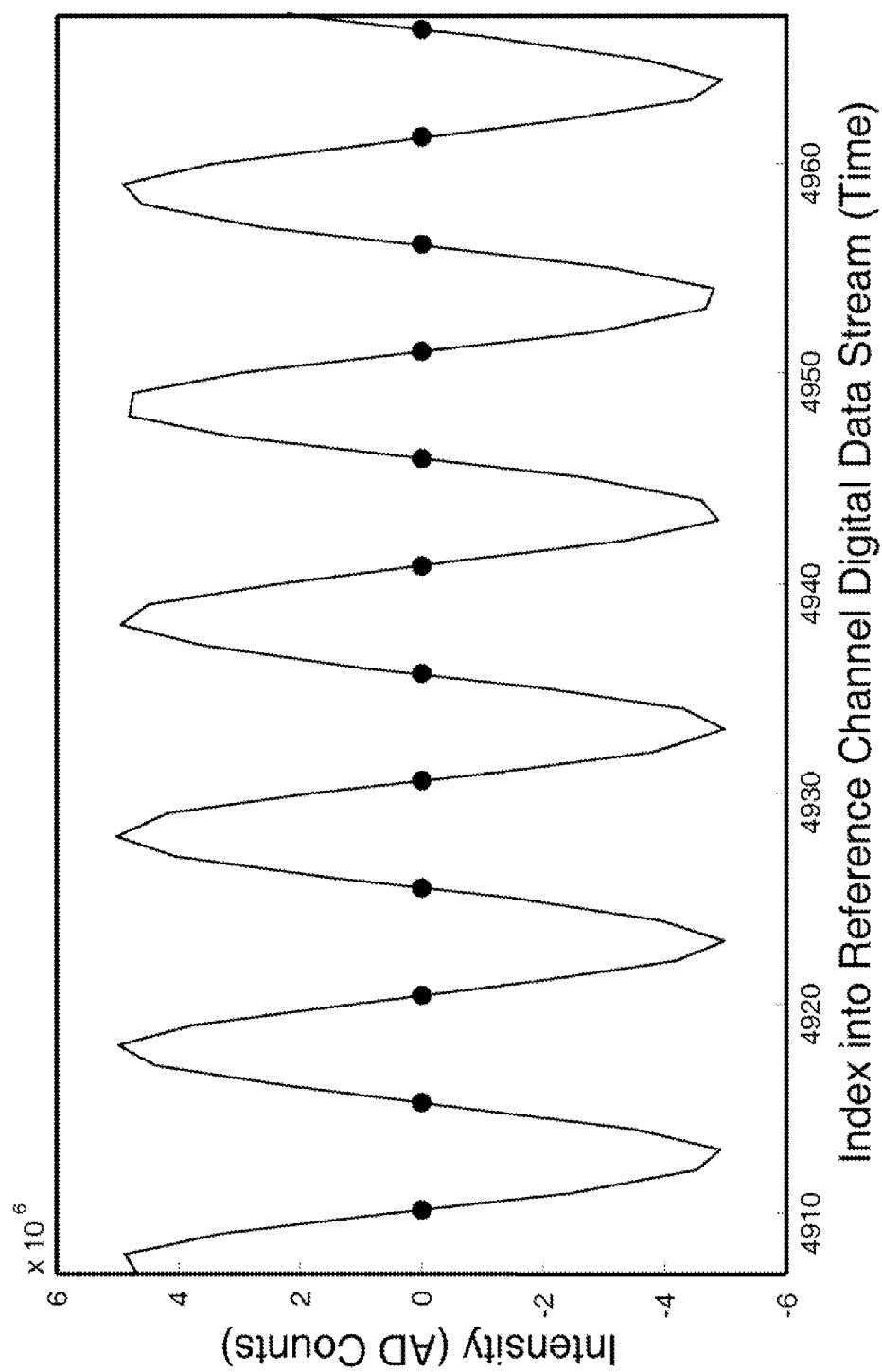
FIG. 4 is a schematic depiction of the magnification of reference signal showing locations of zeros crossings.

The importance of the reference signal is that it allows the velocity distortions to be elucidated as long as the effective wavelength of the reference is known. This can be achieved by determining the times at which the reference signal crosses zero as shown in FIG. 4. As each wave of the monochromatic reference contains two zero crossings, the interval between any adjacent pair of zero crossings corresponds to a physical distance of ½ the wavelength of the laser. By determining the times of these zero crossings, the reference signal allows a "map" or "functional relationship" of time versus OPD to be determined where the derivative of the map corresponds to the instantaneous optical velocity (the rate of change of the OPD) of the moving optical component.

As mentioned above, perfect velocity control of the moving retroreflector would result in a perfectly linear map whose derivative is a constant. Conversely, any deviations from linearity correspond to velocity perturbations that the reference signal captured. As long as the wavelength of the reference is chosen such that all vibrational frequencies are smaller than ½ the frequency of the reference zero crossings, the resulting map obtained from the reference signal contains all information necessary to remove velocity perturbations from the interferogram of interest. However, additional interferometer and electronic non-idealities can distort the measured map and corrupt the desired interferogram if unaddressed.

The present invention relates to the measurement and compensation of these corrupting effects while simultaneously providing a method for standardizing interferograms obtained from multiple spectrometers incorporating said method. While a Michelson interferometer was used to describe the background pertaining to the present invention, the remainder of the discussion is relevant to any interferometer with one or more photodetectors that generate analog spectroscopic and reference signals. The present invention discloses methods and embodiments for the filtering, digitization, and processing operations necessary to convert the spectroscopic and reference analog signals into an accurate digitized interferogram of the spectroscopic light measured in equally spaced intervals of optical path difference.

Figure 5:
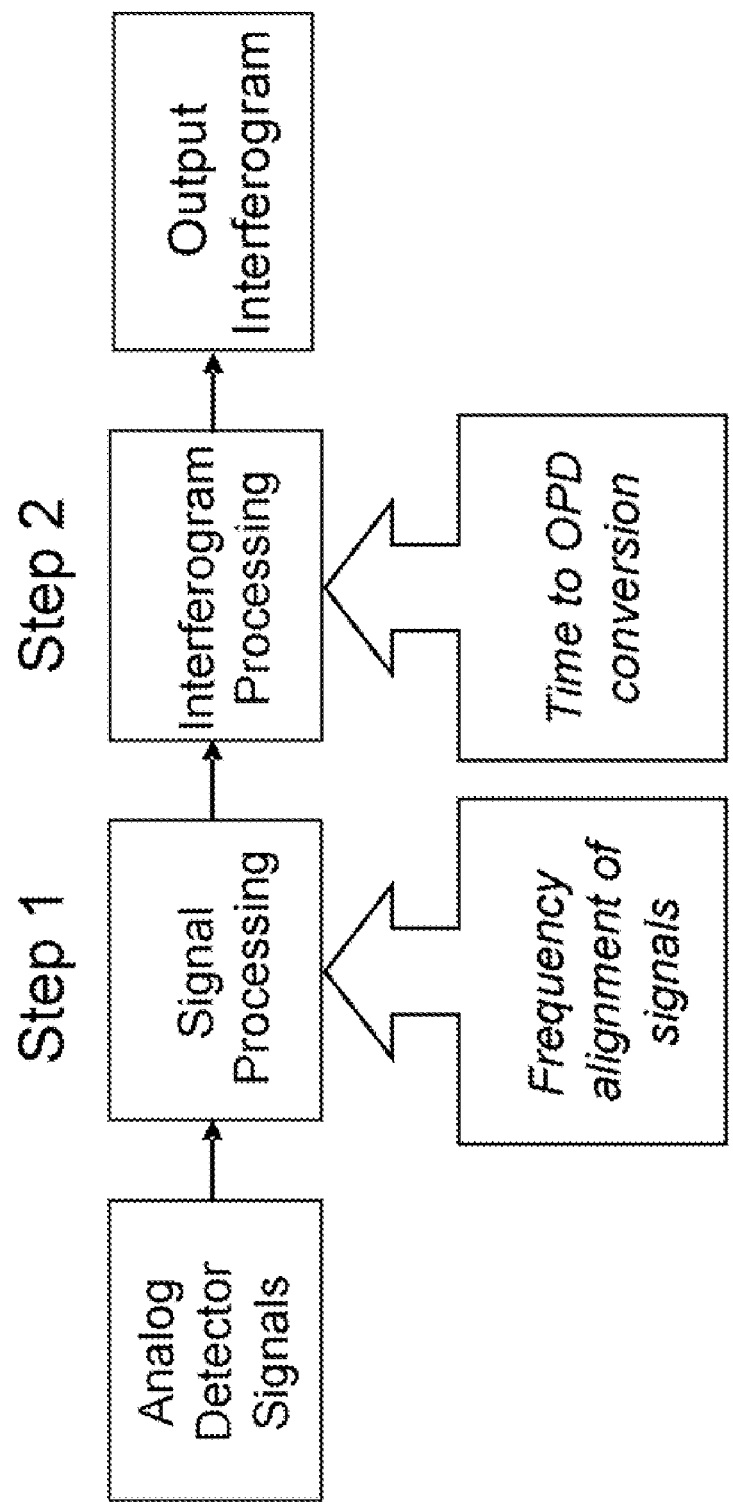
FIG. 5 is a schematic diagram of a 2-step photodetector signal to interferogram process.

The disclosed methods and embodiments can be considered in two steps (shown in FIG. 5). The first step is the conversion of the analog signals into digital signals that have been compensated for frequency (time dependent) dependent sources of non-idealities (see FIG. 6). The second step is the conversion of the digitized reference and spectroscopic signals into a spectroscopic interferogram measured in standardized and uniform intervals of optical path difference (see FIG. 7). At this point, it should be noted that two different sources of signal effects can be present in interferometric measurements. The first type of effect depends upon the physical wavelengths of light present in the spectroscopic and reference beams and the optical properties of the system. These effects are typically wavelength dependent and can manifest in terms of the magnitude and/or phase components of the measured signals. Some examples include the wavelength responses of photodetectors as discussed above and optical dispersion caused by transmissive optics. The dispersion is a wavelength dependent property of the material used to fabricate the optical components and is independent of the optical velocity of the interferometer.

The second class of effect depends on the frequencies present in the detector signals rather than the wavelengths of light. The relationship of optical wavelengths to frequencies for a Michelson interferometer is governed by equation 1. In words, optical effects depend solely on C while time effects depend on $f_o$ which is in turn dependent on the optical velocity, $v$. Thus, when uncompensated sources of time effects are present, a change in the velocity of the moving retroreflector can alter the measured interferogram even though the input light has not been altered. Such errors can unacceptably degrade the accuracy and signal to noise of the measured interferograms.

Figure 8:
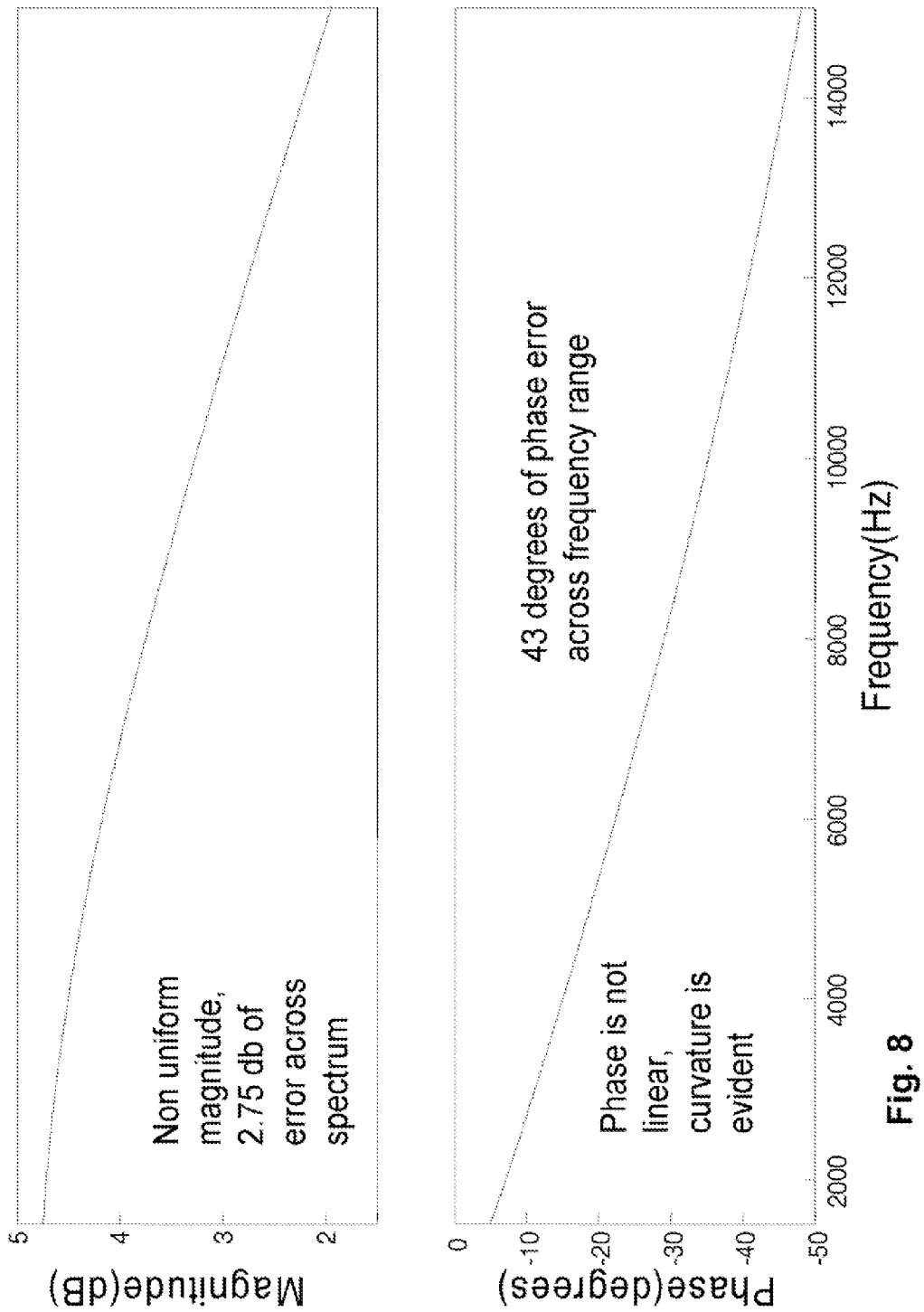
FIG. 8 is a schematic depiction of the frequency response of a spectroscopic photodetector and subsequent analog circuit.

Frequency based effects can be caused by filters (analog or digital), the transfer functions (the ability of the photodetector to respond to rapid changes in photon flux) of photodetectors, or any other analog or digital component with a finite (non-unity) frequency response. The frequency response of any component or filter can be expressed in terms of the magnitude response and phase response as a function of frequency. As an example of the two components of a frequency response, FIG. 8 shows the aggregate magnitude and phase responses of a near infrared photodetector (a 1 mm TE cooled InGaAs detector) and associated analog electronic circuit. This response can be collectively referred to as the response of the spectroscopic channel. FIG. 8 demonstrates that both the magnitude and phase responses of the spectroscopic channel exhibit significant frequency dependence, which can be unavoidable in practical circuit designs.

Figure 9:
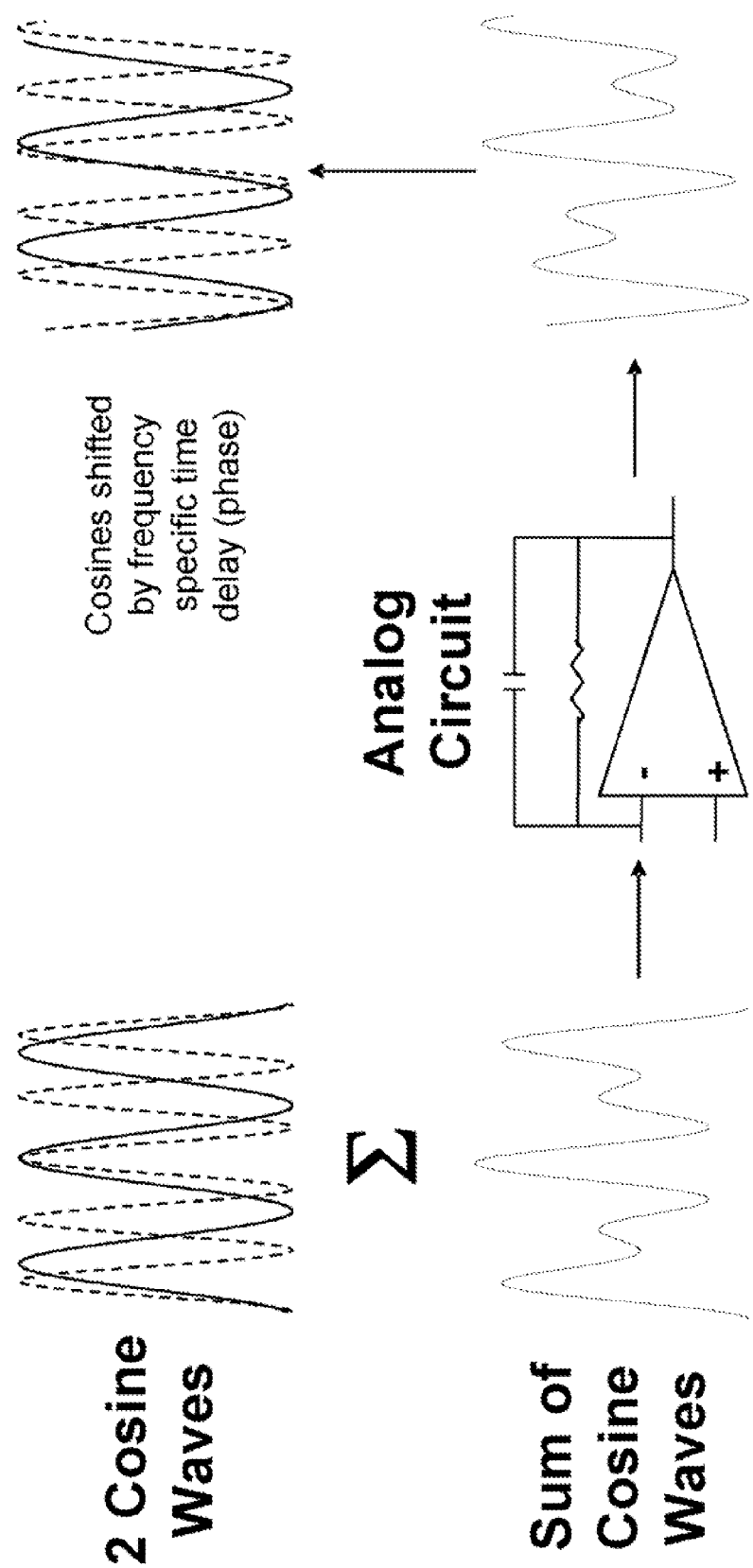
FIG. 9 is a schematic diagram of phase error induced by analog electronics.

The detrimental influence of non uniform (e.g. non-flat) magnitude response is intuitive as it represents a frequency dependent attenuation or amplification that distorts the input signal. The influence of phase errors can be less obvious, although potentially more detrimental, as the different frequencies present in the signal from the interferometer are shifted different amounts of time by the phase error. These time shifts distort the functional relationship (map) between time and OPD, which can result in inaccurate intensity measurements in the interferogram. FIG. 9 shows the effect of phase error on a signal comprised of 2 frequencies. The left column shows the two frequencies individually as well as their sum which is representative of the signal as it would ideally be measured. The right column shows the same two frequencies, each shifted by a different phase error. The sum of the two shifted signals is distinctly different than the target ideal signal. In a practical interferometer, this type of error is further compounded when the phase errors are combined with imperfect velocity control. In this situation, complicated interactions between optical velocity and frequency response are created that can preclude acquisition of photometrically accurate interferograms.

Figure 10:
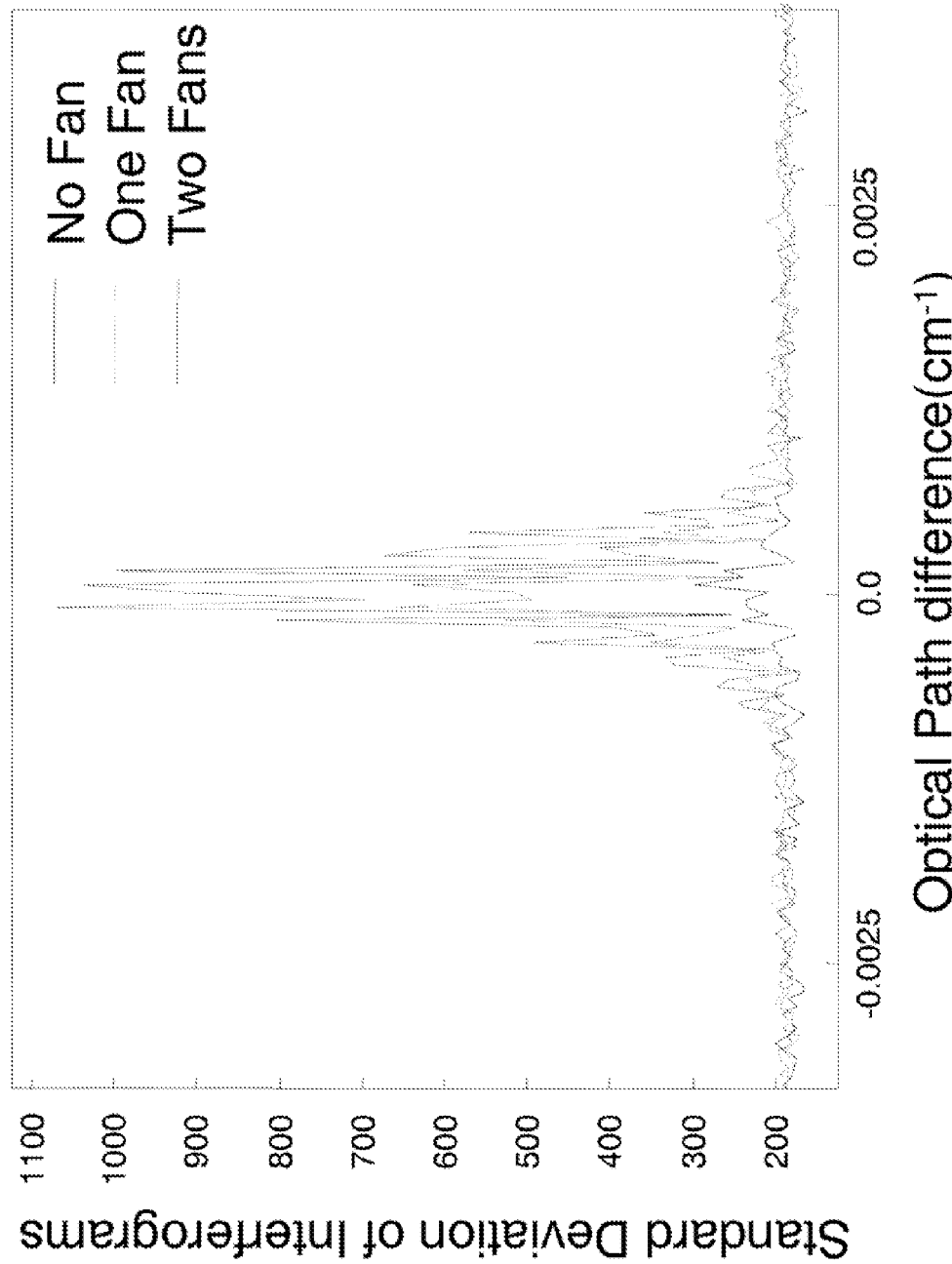
FIG. 10 is a schematic depiction of an example of error due to uncompensated time phase error between the spectroscopic and reference channels the optical signal is constant for the three cases.

FIG. 10 shows an example of the photometric error induced by uncompensated frequency dependent errors by comparing the standard deviation as a function of optical path difference of 1000 interferograms of a stable light source for each of three cases that were acquired from a Michelson interferometer incorporating a Helium-Neon reference laser. The first case represented no perturbation to the interferometer, the second represented a single fan located near the interferometer in order to induce mechanical vibrations, and the third represented the addition of a second fan to further increase the magnitude of the mechanical vibrations. The optical signal was constant for all cases as such any difference between the standard deviations for the three cases is attributable to interferogram measurement error caused by the induced vibrations. As the purpose of the Helium-Neon laser is to provide an internal reference for the location of the moving retroreflector despite the presence of vibrations, the inflated interferogram standard deviations of the fan cases are indicative that uncompensated sources of frequency dependent errors are present and preventing the laser from serving its intended purpose.

Step 1: Signal Processing and Correction of Frequency Errors

Figure 6:
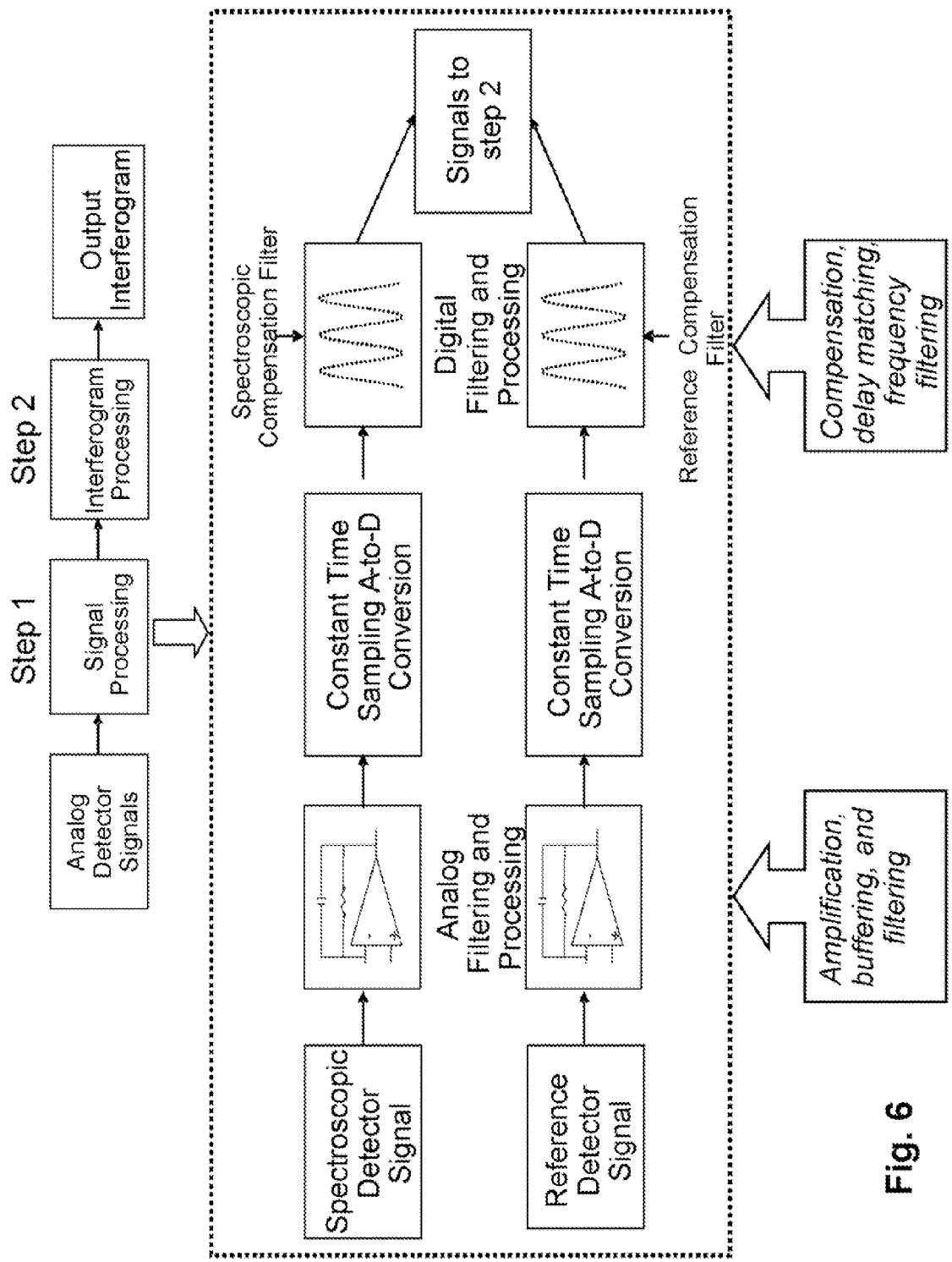
FIG. 6 is a schematic flow diagram of an embodiment of the $1^{st}$ step to process photodetector signals into interferograms sampled at standardized optical path differences.

As shown in FIG. 6, the objective of the first step is to obtain digitized photodetector signals that have been compensated or corrected for frequency dependent phase and magnitude errors. For clarity, step 1 does not address sources of optically dependent phase and magnitude errors (e.g. those caused by optical dispersion) as they are best addressed in subsequent steps. The first objective in this step is the preparation of the analog detector signals for analog to digital conversion. In some embodiments of the present invention, the analog preparation can include current to voltage conversion (for those detectors whose output signal is a function of current rather than voltage), amplification (to improve signal to noise and satisfy ADC dynamic range requirements), frequency filtering (to improve signal so noise and band limit the signal), buffering (to prevent one part of the analog circuit from interacting with another), and other conditioning (such as voltage bias adjustment) steps required to meet the input requirements of the analog to digital converter. Each of these steps can be performed one or more times in conjunction with any or all of the other steps and in any order, Whenever possible, the design of the analog circuit should be such that frequency based response errors are minimized for all frequencies of interest. In some embodiments, this can result in different analog circuit designs (and a different combination of steps) for the spectroscopic and reference channels. In some embodiments, particular attention is paid towards eliminating nonlinear sources of phase error, even at the expense of increasing the difference in linear phase error between the channels. The primary goal of the analog circuit design should be to minimize the number and severity of response errors that need to be compensated in subsequent parts of step 1. The frequency responses of various analog circuits are well understood in the art and can be obtained using a variety of commercially available software packages.

Regardless of the final analog circuit design, some response errors will inevitably be induced in the signals prior to digitization. This can be due to practical constraints on the cost or power consumption of the circuits (e.g. the best analog circuit components may exceed budget or power constraints) or the fact that the interferometer performance requirements could exceed the design limits of the available circuit components as all analog circuits have an imperfect frequency response. Consequently, some means for compensating for the introduced response errors is often desirable following digitization.

The ability to effectively compensate for response errors is critically dependent on the methodology by which the analog signals are digitized. Historically, many embodiments of interferometric spectrometers used an analog comparator to determine when zero-crossings occurred in the reference signal and subsequently trigger an ADC to digitize the spectroscopic analog signal at a rate equivalent to the frequency of the zero crossings. In these embodiments, the reference signal was not digitized. Given the imperfect nature of analog circuits, this historical approach made compensation of frequency response errors difficult as those in the reference channel were often ignored and those in the digitized spectroscopic channel were difficult to treat due to the relatively low sampling rate imparted by the frequency of the reference zero-crossings (unless the reference laser was a much shorter wavelength than the shortest of interest in the spectroscopic channel).

In the early 1990's, Brault introduced an alternative approach to digitize interferometric signals using analog to digital converters that sampled in equally intervals of time. These filters are not triggered and offer sampling rates far higher than the zero-crossing rates in practical interferometers. The constant time approach devised by Brault allows several distinct advantages relative to the historical approach. First, application of two ADC's (one for the reference channel and one for the spectroscopic channel) allows the digitization of both channels independently thereby enabling their unique frequency response errors to be addressed individually using dedicated compensation filters. Second, the sampling of the spectroscopic channel is no longer directly linked to the frequency of the reference signal's zero crossings, thereby allowing the spectroscopic channel to be sampled at any rate or fashion consistent with the tenets of sampling theory. This advantage is principally important in step 2 of the present invention, where it will be used in various embodiments to standardize interferograms measured on multiple instruments, In some embodiments it can be advantageous to minimize the interaction between frequency response errors and vibrations through careful opto-mechanical design. As the opto-mechanical design specifies the vibrational modes of the system it can directly influence the manifestation of vibrational effects in the spectroscopic system. Many historical approaches attempt to mitigate vibrations through opto-mechanical designs with vibrational modes at frequencies that are not anticipated to be present in the operational environment of the interferometer. For example, many commercial interferometers are designed such that the many vibrational modes are greater than 1000 Hz, which exceeds most environmental sources of vibration. While this approach is feasible and amenable to use with the present invention, it often results in large, heavy interferometers.

An alternative approach is to minimize the number of vibrational modes in the system and attempt to keep them comparatively low in frequency, even at the expense of increasing the magnitudes of those that remain. Referring to FIG. 3, this approach would reduce the complexity of the power spectral density by removing side peaks (eliminating vibrational modes) and narrowing the overall width of the power density spectrum. The objective of these approaches is not necessarily to eliminate vibrations completely, but rather minimize the breadth of their effects and simplify the frequency compensation process. This allows narrower digital filter pass bands and constrains the number and range of frequencies that need to be compensated.

Figure 11:
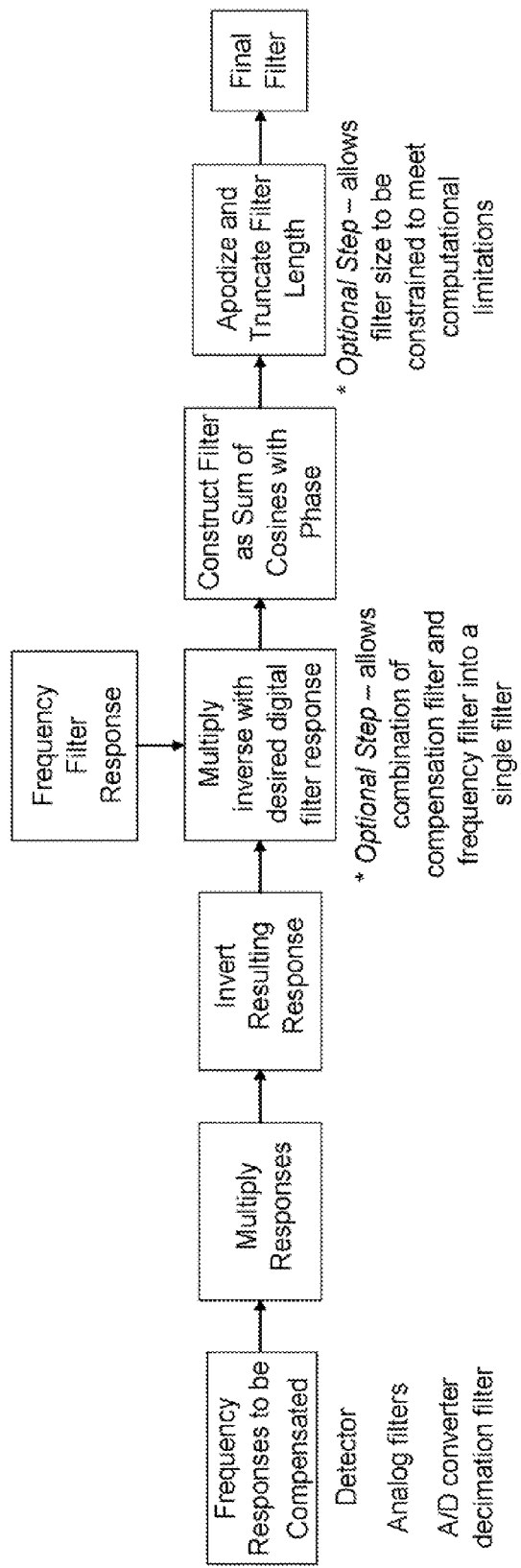
FIG. 11 is a schematic diagram of compensation filter construction process.

Regardless of the opto-mechanical design approach, velocity control will be imperfect and sources of frequency response error will always be present. As such it is advantageous to compensate for the frequency response errors in order to eliminate their detrimental effects and prevent interaction with the imperfect velocity control. As mentioned above, constant time analog-to digital conversion allows the spectroscopic and reference signals to be digitized independently at high sampling rates (typically 48 kHz or greater). This allows the frequency response errors of each channel to be treated independently using dedicated compensation filters. FIG. 11 is a diagram of the compensation filter construction process of the present invention.

The first step in constructing compensation filters is to obtain frequency responses for each source of error to be compensated. They can be measured using a signal generator and spectrum analyzer, a modulated/controllable light source of appropriate spectral content, or via an approach such as that described in U.S. Pat. No. 5,923,422. However, in some embodiments of the present invention that incorporate a continuous spectroscopic light source (e.g. a filament lamp, blackbody radiator, combinations of LED's or VCSEL's), the model fitting described in U.S. Pat. No. 5,923,422 is unnecessary, and in fact, disadvantageous as it provides no new information regarding the frequency response and can require specialized regression and fitting steps. The fitted model in U.S. Pat. No. 5,923,422 is used to define the frequency response in a closed form equation that has a known inverse. The inverted frequency response can be used to determine a filter target response (the filter target response can be just the inverted response, and can include other filters as desired). The compensation filter is then constructed to match the filter target response as closely as possible. The present invention computes the inverse directly from the frequency response obtained from the forward and reverse interferograms and constructs the compensation filter using a discrete summation of cosines that explicitly incorporates phase. Thus, the present invention provides for an implementation of the Brault method that inherently generates stable compensation filters that contain real filter coefficients (in a complex sense) without the need to fit experimentally measured data to models of transfer functions.

In an example embodiment for computing frequency response of the photodetector and analog electronics in the spectroscopic channel involves acquiring a series of interferograms that span a range of positive and negative optical path differences (sometimes called "double sided interferograms"). Furthermore, the interferograms are acquired with the moving retroreflector traveling in both directions (termed "forward" and "reverse"). The premise of this approach is that optical sources of phase and magnitude are independent of the direction of retroreflector travel, while frequency dependent errors will change as the direction of movement changes. As such, the difference in the frequency response between the forward and reverse interferograms represents the frequency dependent sources of signal error in the system and contains all information necessary to form the compensation filter.

Using this approach, the signal to noise of the measured frequency response can be improved by recording additional forward and reverse interferograms. Furthermore, the presence of vibrations and other environmental disturbances can make accurate determinations of the frequency response difficult. In this case, the above method can be used in a recursive approach to achieve the desired precision. In other words, a frequency response can be calculated using the above method, a compensation filter generated and implemented, and a new frequency response calculated from compensated interferograms to determine if any residual, uncompensated, frequency response error remains due to the imperfections of the first frequency response and filter.

This process is also conducive to the dynamic updating of the compensation filters to account for any changes to the spectroscopic device. For example, if the frequency response of the analog circuits of the system were dependent upon ambient temperature, the method discussed above could be used to regularly check for changes in the frequency response of the system and update the compensation filters as deemed necessary. This process is easily automated and ran be designed such that no user effort is necessary.

Figure 12:
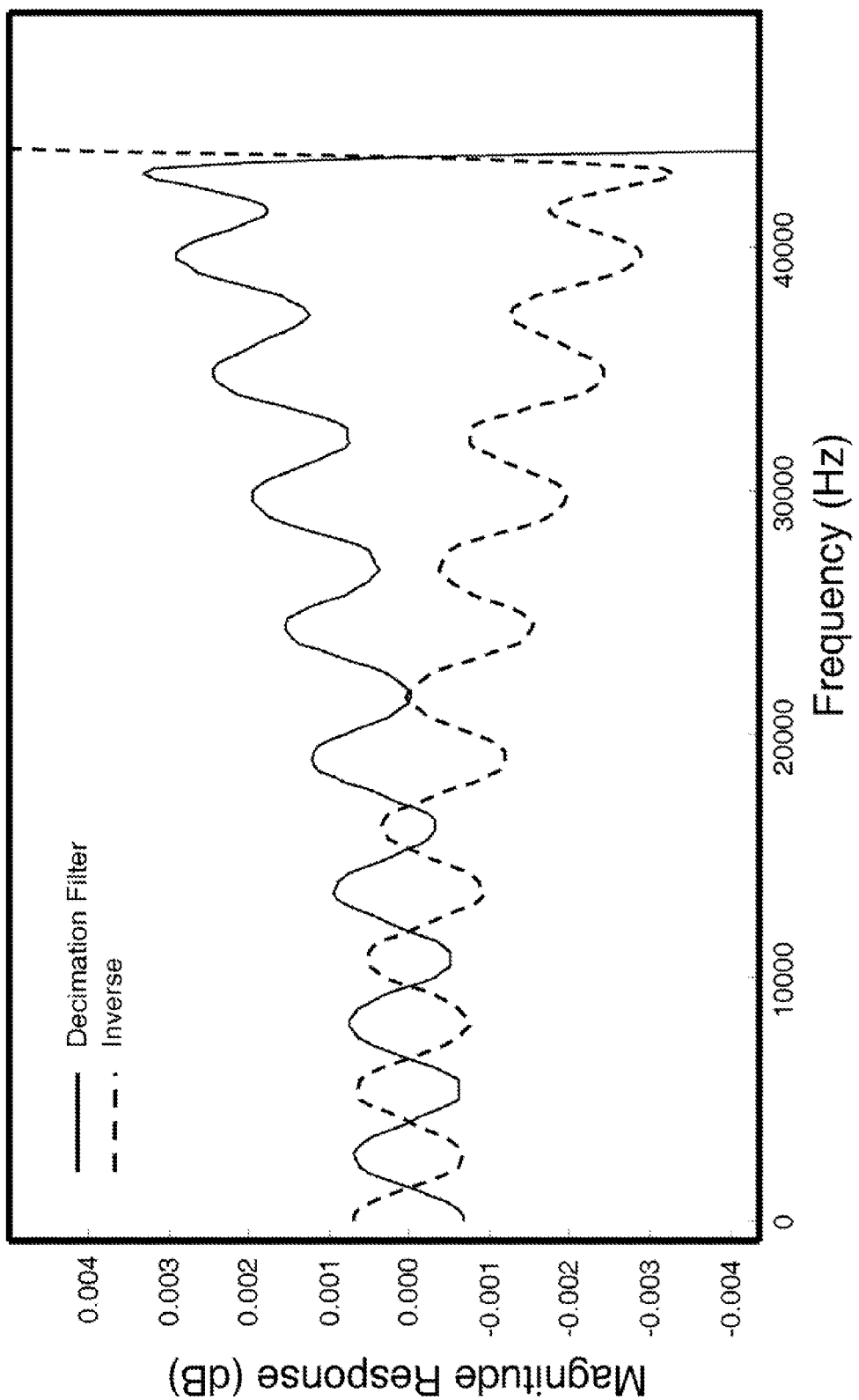
FIG. 12 is a schematic depiction of an example of AD converter decimation filter magnitude response and its inverse (phase response is perfectly linear).

Regardless of the approach to measure frequency responses, the objective is to determine the cumulative time domain frequency response error introduced into the spectroscopic and reference signals. The detector, analog electronics, and any digital filters can be sources of undesirable frequency response effects that can be measured individually or in isolation. FIG. 8 shows an example of the frequency response of a near-infrared photodetector and subsequent analog electronics that condition the photodetector signal for digitization. Ideally, the magnitude response would be flat and the phase response linear (a linear phase error in degrees or radians versus frequency is a uniform time delay). Clearly, the response measured in FIG. 8 deviates from the ideal response and therefore is responsible for frequency response error in the interferometric signals. Another potential source of frequency response error includes digital filters. In some cases, ADC's may have built-in FIR filters that cannot be bypassed. FIG. 12 shows the magnitude response of such a filter that exhibits ripple that can be undesirable in some applications. The phase response of FIR filters is linear (a uniform time delay), and is not shown. FIG. 12 also shows the inverse of the FIR filter magnitude response which is indicative of the response required to negate the detrimental effects of the filter.

As frequency responses (in complex form rather than magnitude and phase form) are multiplicative, the responses in FIGS. 8 and 12 can be combined in order to determine the cumulative response to be compensated for that channel (e.g. the reference and spectroscopic channels are treated independently and have dedicated compensation filters). One skilled in the art recognizes that the above example can be extended to include as many responses from as many sources as deemed necessary to achieve the desired level of compensation. Regardless, when the cumulative response for compensation has been measured, its inverse is calculated using the algebraic relationship $X^{-1}=1/X$ where X is the complex, cumulative frequency response.

Figure 13:
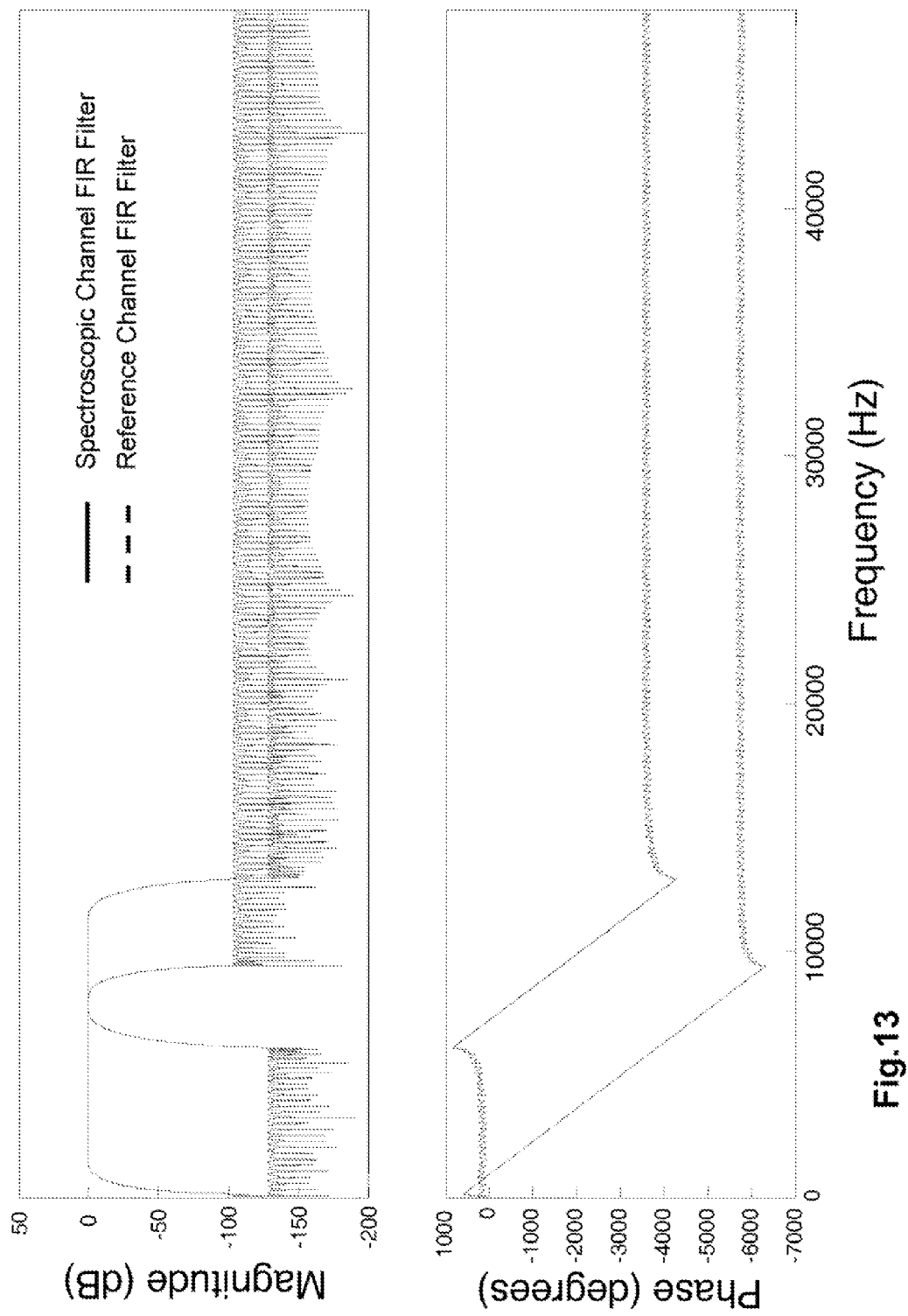
FIG. 13 is a schematic depiction of examples of spectroscopic and reference channel FIR filter frequency responses.

The next objective of the compensation process is to develop a filter whose response matches the inverted response over the desired frequency range of interest. Undesired frequency ranges (frequency ranges where no light is measured or of interest) can be suppressed via frequency filtering, apodization, windowing, or combinations thereof. Suppression of unnecessary frequency ranges can be desirable as it condenses the range of frequencies over which the compensation filter must be stable and can improve the spectroscopic signal to noise ratio. FIG. 13 shows frequency response of some example filters for the spectroscopic and reference channels that suppress undesired frequency ranges. These responses are multiplied with the previously determined inverses to form the final target responses for the compensation filters.

The present invention forms the compensation filters as a discrete sum of cosines that include a phase argument as shown in equation 2.

$$\text{Filter}=\Sigma_{n=1}^{N} I_{f_n} \cos(2\pi f_n t + \phi_{f_n})$$

where f is a vector of length N that contains the frequencies to be included in the filter, t is a vector of times for which each frequency is to be evaluated (the spacing between values of t is typically the inverse of the ADC sampling rate), $\phi_f$ is a vector of length N containing the phases associated with the frequencies in f, and $I_f$ is a vector of length N containing the magnitudes associated with the frequencies in f. The number of and spacing between the frequencies in f depends on the desired accuracy of the filter, which generally improves with more frequencies at closer spacing.

In general, the accuracy of the filter relative to the target response improves as the filter length increases (e.g. as the size of t increases). However, the minimum length of the time vector, t, depends on the frequency with the largest phase error in units of time. In other words, signals with large phase errors must span a wider range of time in order to appropriately realign all frequencies. As mentioned above, this situation makes the suppression of unnecessary frequency ranges desirable. For example, if the spectroscopic signal is confined to the 2000-4000 Hz range, then the 0-2000 Hz range can be suppressed such that it does not contribute to the formation of the compensation filter and unnecessarily influence the size of the compensation filter (e.g. if the 0-2000 Hz range had large phase errors relative to the 2000-4000 Hz range). Furthermore, if all frequencies share a significant mean phase shift (the linear component of the phase response to be inverted) it can be removed prior to the formation of the compensation filter and accounted for in subsequent steps. The output filters can be windowed via a suitable tapering or other function (e.g. a Gaussian window) if deemed appropriate.

Figure 14:
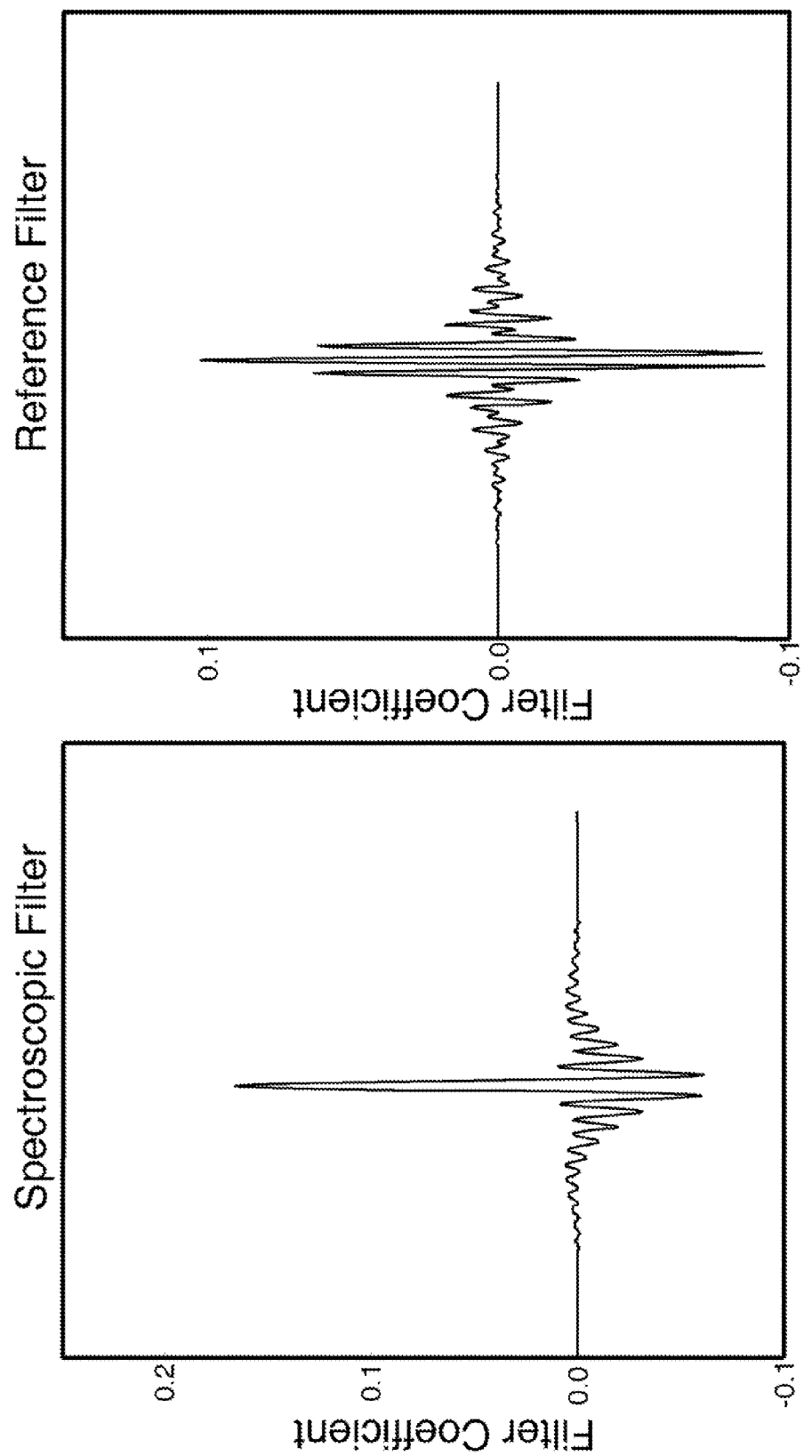
FIG. 14 is a schematic depiction of examples of spectroscopic and reference channel compensation filters.
Figure 15:
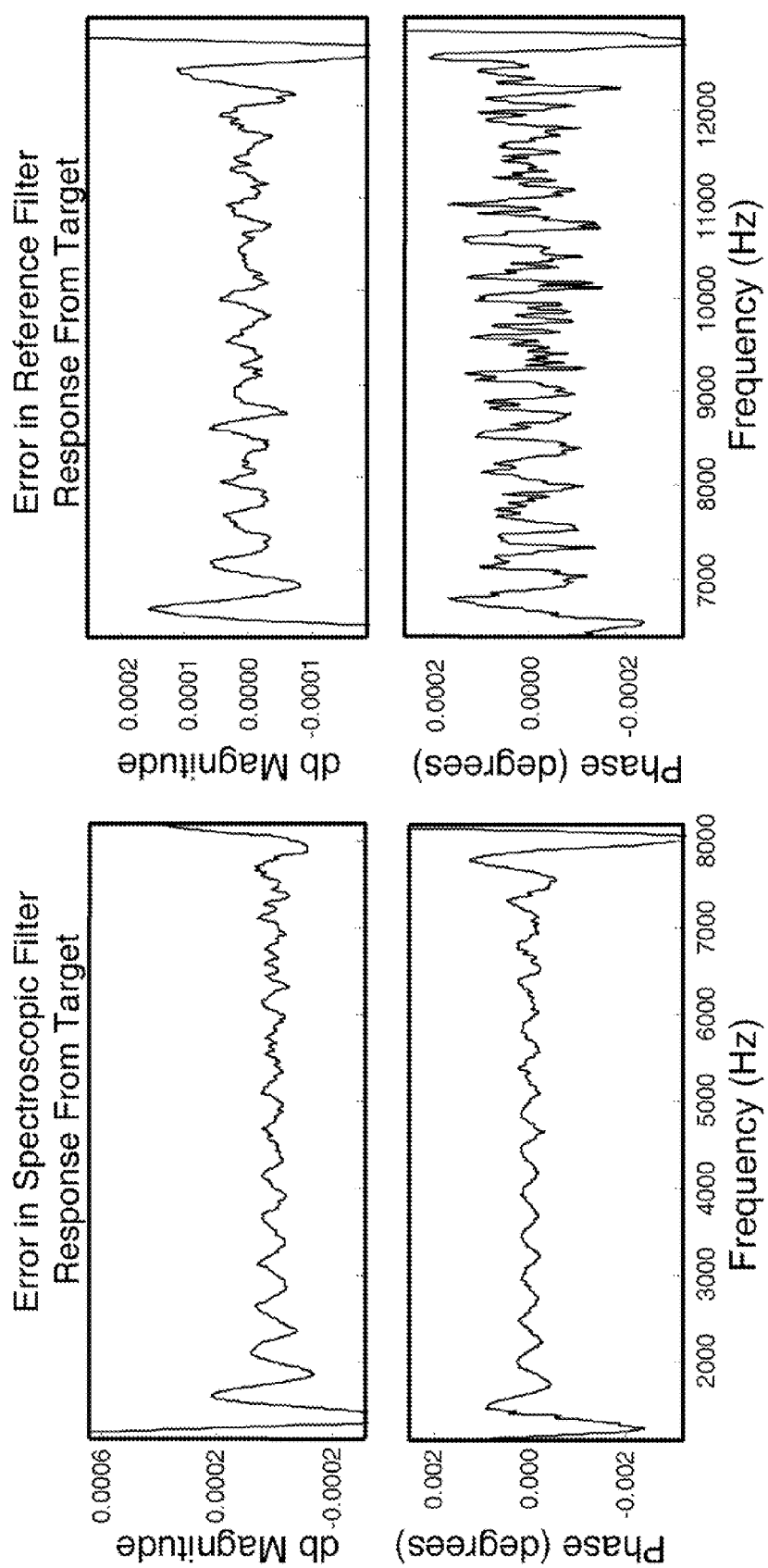
FIG. 15 is a schematic depiction of error of compensation filter frequency responses relative to their target frequency responses.

The advantages of this approach are that the filter coefficients are a single vector of real (in a complex sense) values that result in an inherently stable filter. Furthermore, the filter calculations are comprised of straightforward mathematical operations that are conducive to rapid computation in virtually any software environment. This can be particularly important in applications where the filters are recomputed regularly and real-time performance must be maintained. FIG. 14 shows spectroscopic channel and reference channel compensation filters generate using an embodiment of the present invention. FIG. 15 shows the error in the frequency responses of the compensations filters in FIG. 14 relative to their target responses.

These filters are applied directly to the output of the analog to digital converter. If any constant delays (the linear part of the phase) were removed prior to the formation of the compensation filters, they can be accounted for at this point by shifting the spectroscopic signal relative to the reference channel. Alternatively, the constant delays can be provided to step 2 and accounted for in the determination and standardization of the interferogram. The resulting filtered signals will be compensated for frequency response errors such that all frequencies in both the spectroscopic and reference channels are realigned in terms of magnitude and phase (with the possible exception of a constant time shift between the channels) and thus prepared for the determination and standardization of the interferogram in step 2.

Step 2: Determination and Standardization of the Interferogram

The goal of this step is to obtain photometrically accurate interferograms sampled in equal intervals of optical path difference (OPD) using the reference and spectroscopic signals obtained from step 1. For the purposes of the present invention, this step assumes that significant sources of frequency response error were eliminated in the design process or compensated using the process defined in step 1. Note that the level of significance can depend on the application of interest; some may require more stringent designs or precise compensation than others.

Figure 7:
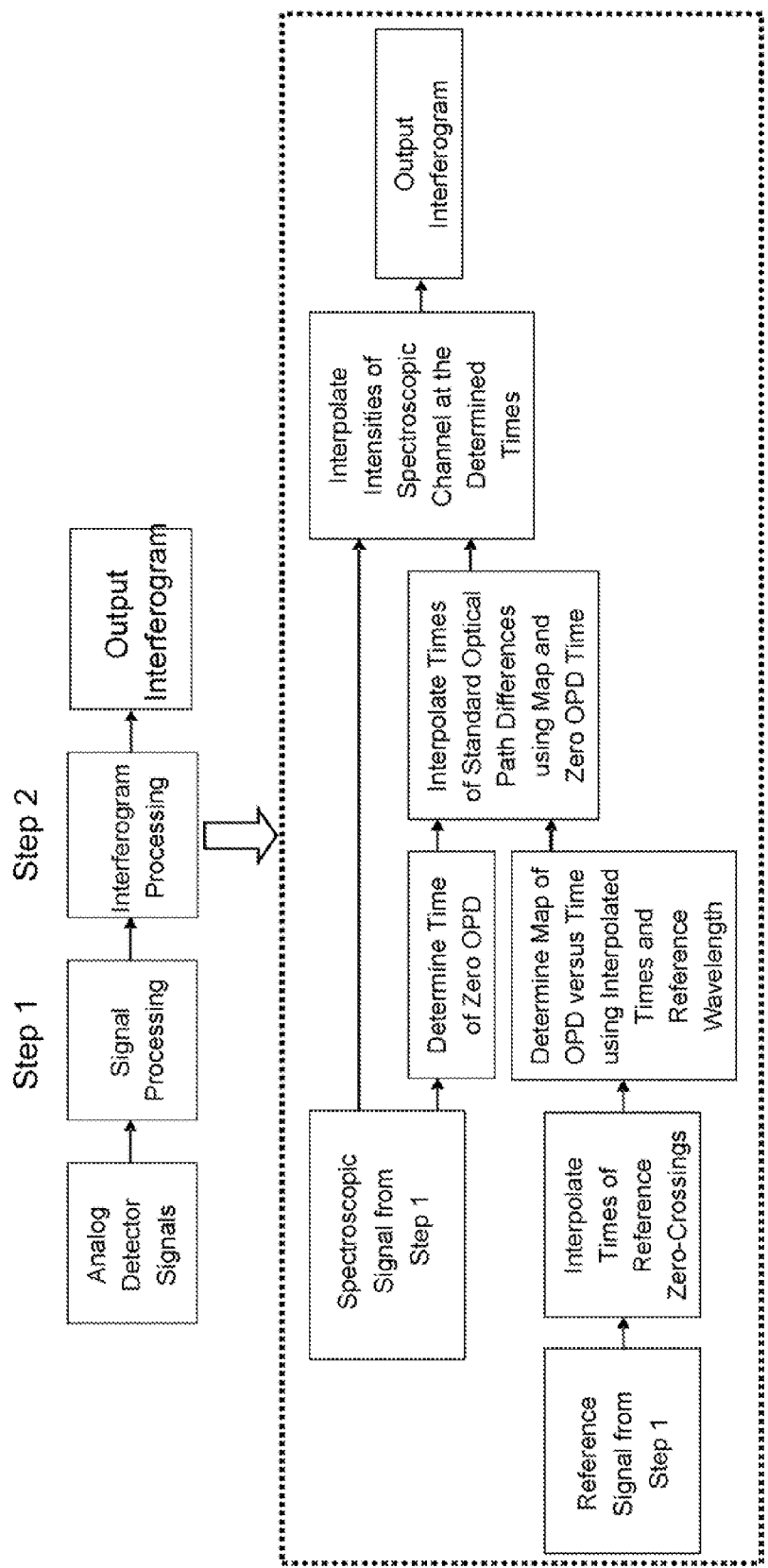
FIG. 7 is a schematic flow diagram of an embodiment of the $2^{nd}$ step to process photodetector signals into interferograms sampled at standardized optical path differences.

Referring now to FIG. 7, the first step in the interferogram determination and standardization process is to interpolate the times corresponding to known and equidistant intervals of OPD in the reference channel. For the purposes of the demonstrating the present invention, the laser channel zero-crossings will be used. However, it is recognized that other parts of the reference channel, such as peaks and troughs or zero-crossings of derivatives of the laser channel, are also suitable for this step. Regardless, it is unlikely that a digitized point will be exactly coincident with a given zero-crossing. Consequently, interpolation of the digitized signal is required. While the method of interpolation can depend on the degree of accuracy and precision required for the spectroscopic application, there are several viable approaches known in the art. Some examples of interpolating methods or filters include Sinc, polynomial, FIR, mid-point, linear, polyphase, splines, or combinations thereof.

In an example embodiment, the approximate time of a zero crossing is determined by forming the running multiplication of the reference signal. In other words, if x is a vector length n of the digitized reference signal, then the running multiplication is given by $x_n \cdot x_{n-1} \ldots x_2 \cdot x_1$. Negative values of the running multiplication are indicative that a zero crossing occurred between the times corresponding to the two values of x that were multiplied to form the negative value. The approximate time of the zero crossing is then used to define a region for local interpolation. In other words there is no need to interpolate regions of the reference channel signal that do not contain a zero crossing. This is particularly advantageous in applications of interferometric spectroscopy where the signals must be processed and interferograms determined in real time. In these situations, computational efficiency is improved by eliminating unnecessary interpolations.

In the above discussed example embodiment, a cubic spline is fit to a window surrounding each approximate zero crossing and the midpoint between the two points bracketing the zero crossing is interpolated. The running multiplication of the two bracketing points and the midpoint ($x_A \cdot x_M$ and $x_M \cdot x_B$, where A and B are the bracketing points and M is the midpoint) are calculated, One of the two values will be negative and is indicative that the zero-crossing lies between the corresponding two points (either between A and M or between M and B). The excluded point (A or B) is discarded and a new midpoint is interpolated between the newly determined bracketing points, The previously determined spine remains valid for the new interpolation; there is no need to fit a new one. In some embodiments, however, it may be advantageous to recalculate the fit for each new interpolation. Regardless, this approach recursively interpolates successive midpoints until each zero-crossing is determined to sufficient precision and helps to minimize the number of interpolations performed by limiting them to localized regions surrounding the zero crossings.

Assuming that the reference signal corresponds to an effectively monochromatic light source, the zero crossing times determined from the interpolation step will correspond to equal intervals of OPD. In the case of an ideal Michelson interferometer, the OPD interval will be equal to ½ the wavelength of the reference laser (typically a Helium Neon laser). However, practical consequences of opto-mechanical design can alter the effective wavelength of the reference laser. For example, beams of finite diameter cannot be perfectly collimated which results in the effective wavelength of the reference laser often appearing to be smaller (larger wavenumber) than its true value. A similar effect is observed if the reference laser passes through the interferometer at a different angle than the spectroscopic light. To a first-order, the mathematical relationship between angle and effective wavelength is given by equation 3.

$$\sigma_{\it eff} = \sigma\left(1 - \frac{\alpha^2}{4}\right) \tag{3}$$

Where $\sigma_{\it eff}$ is the effective wavenumber of the reference, $\sigma$ is the true wavenumber of the reference and $\alpha$ is the angle of misalignment in radians. In order for photometrically accurate interferograms to be obtained, $\sigma_{\it eff}$ must be known.

As the above examples indicate, some means of determining the effective wavelength of the reference laser is required in order to accurately determine the location of the moving retroreflector as a function of time. In other words, the non-idealities of the interferometer need to be accounted for in order to know the true OPD interval between the times determined from the reference laser zero crossings. This is often accomplished by a calibration step using a sample or light source with known, stable content. Some examples of samples suitable for calibration in the near infrared part of the electromagnetic spectrum are emission lamps filled by noble gasses (argon, xenon, helium, etc), rare earth oxides (Holmium oxide, etc), long wavelength gas lasers (where the laser wavelength is longer than the interferometer reference), and polystyrene. Other spectral regions have suitable samples that are well known in the art.

The selected standard is measured on the interferometric spectrometer of interest and the properties of the resulting spectrum (e.g. peak locations) are compared to the known properties of the sample. The difference between the two is used to determine the effective wavelength of the reference which is used for the acquisition of subsequent measurements from the interferometric spectrometer. For example if a Helium Neon Laser were the reference in an interferometer, the calibration step begins with an assumed reference wavelength of 632.8 nm (the true lasing wavelength of a HeNe laser). A spectrum of a calibration standard, a Xenon emission lamp in this example, is then acquired. The locations of the Xenon spectral features are compared their known wavelengths. Any discrepancy between the observed and known locations is indicative that the effective wavelength of the HeNe laser is not 632.8. The effective wavelength of the HeNe laser is then altered until the Xenon features appear at their known, correct locations in the measured spectrum. The accuracy of the effective wavelength determination depends on several factors including the signal to noise of the measured standard spectra and the location of the standard sample in the optical path of the spectroscopic device. It is desirable for the wavelength standard light to follow the same optical path as the light used to interrogate subsequent samples.

Figure 16:
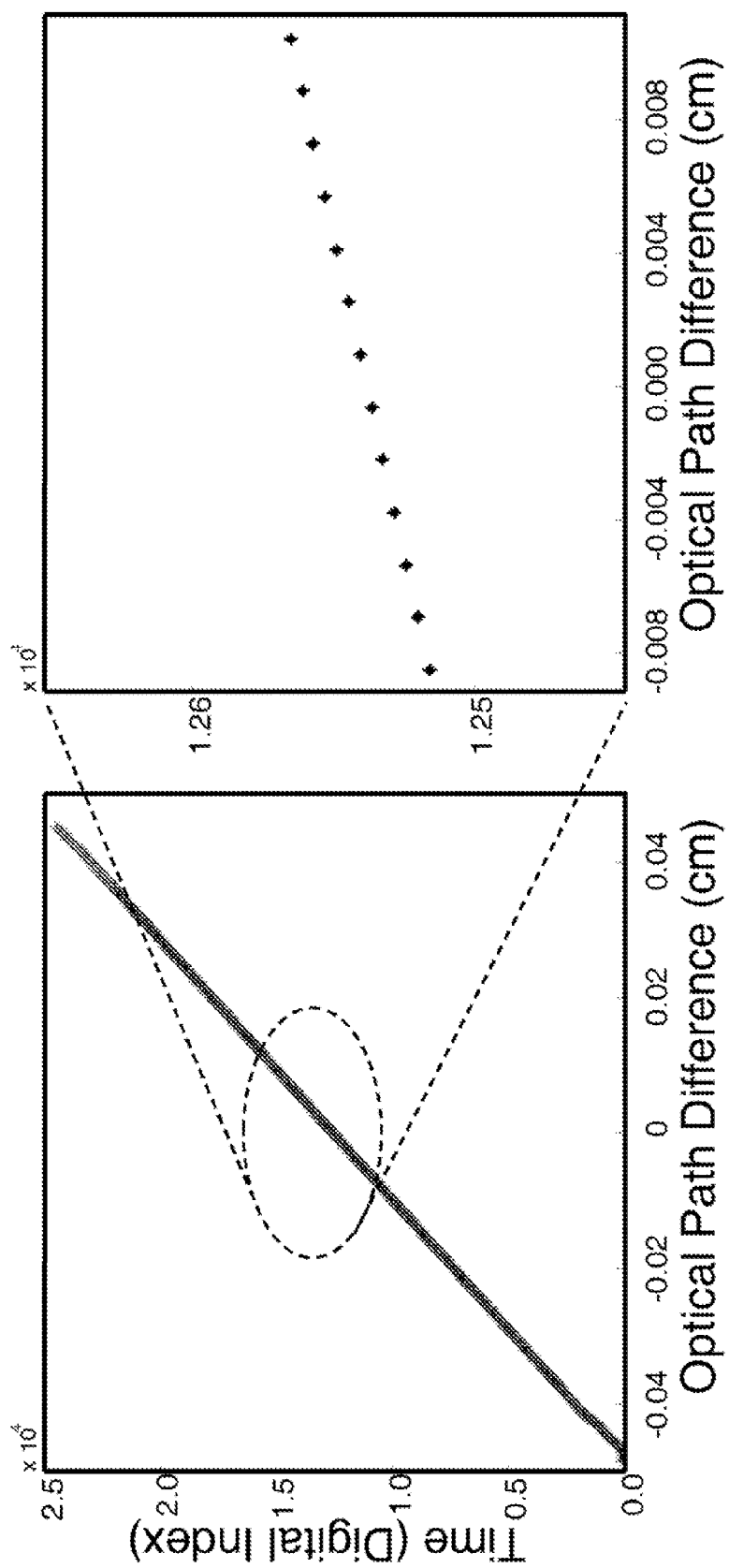
FIG. 16 is a schematic depiction of zero crossing times as a function of optical path difference for a portion of one scan of the interferometer—a "map" of OPO.

FIG. 16 shows an example "map" or "functional relationship" of OPD versus time obtained using the interpolated times of the reference channel zero crossings and the associated OPO interval of the effective reference wavelength. The functional relationship can be formed by a variety of means including polynomial, spline, Sinc, Savitzky-Golay, other fitting method, or a combination thereof. In some example embodiments, the functional relationship would be continuous over the range of OPD's spanned in the desired interferogram. However, multiple piecewise or local functions, rather than a continuous function, could be used to serve the same purpose.

Some current interferometric methods employ a direct interpolation approach rather than determination of a functional relationship as in the present invention. A direct interpolation approach involves interpolating the times of the reference channel zero crossings from the spectroscopic channel. In such cases, assuming that a wavelength calibration procedure such as that described above was performed, the resulting interferogram will be photometrically correct. However, the specific location (the wavenumber values) of the interferogram data points will correspond to those defined by the effective wavelength of the reference. As multiple instruments can have different degrees of alignment error, they can have different effective reference wavelengths even if they use references of the same type (e.g., HeNe lasers). Consequently, the location of the spectral data points for the instruments will not be consistent using a direct interpolation approach.

This effect can be very pronounced if the difference in the effective wavelengths of the reference signals between instruments is large, for example in the case of diode lasers or vertical cavity surface emitting lasers (VCSEL's). In this case, the true wavelength of the laser can vary between instruments in addition to instrument-specific alignment or optical influences on the effective wavelength. The present invention addresses both classes of effects by defining a series of standardized optical path differences to be used by all interferometric devices.

Figure 17:
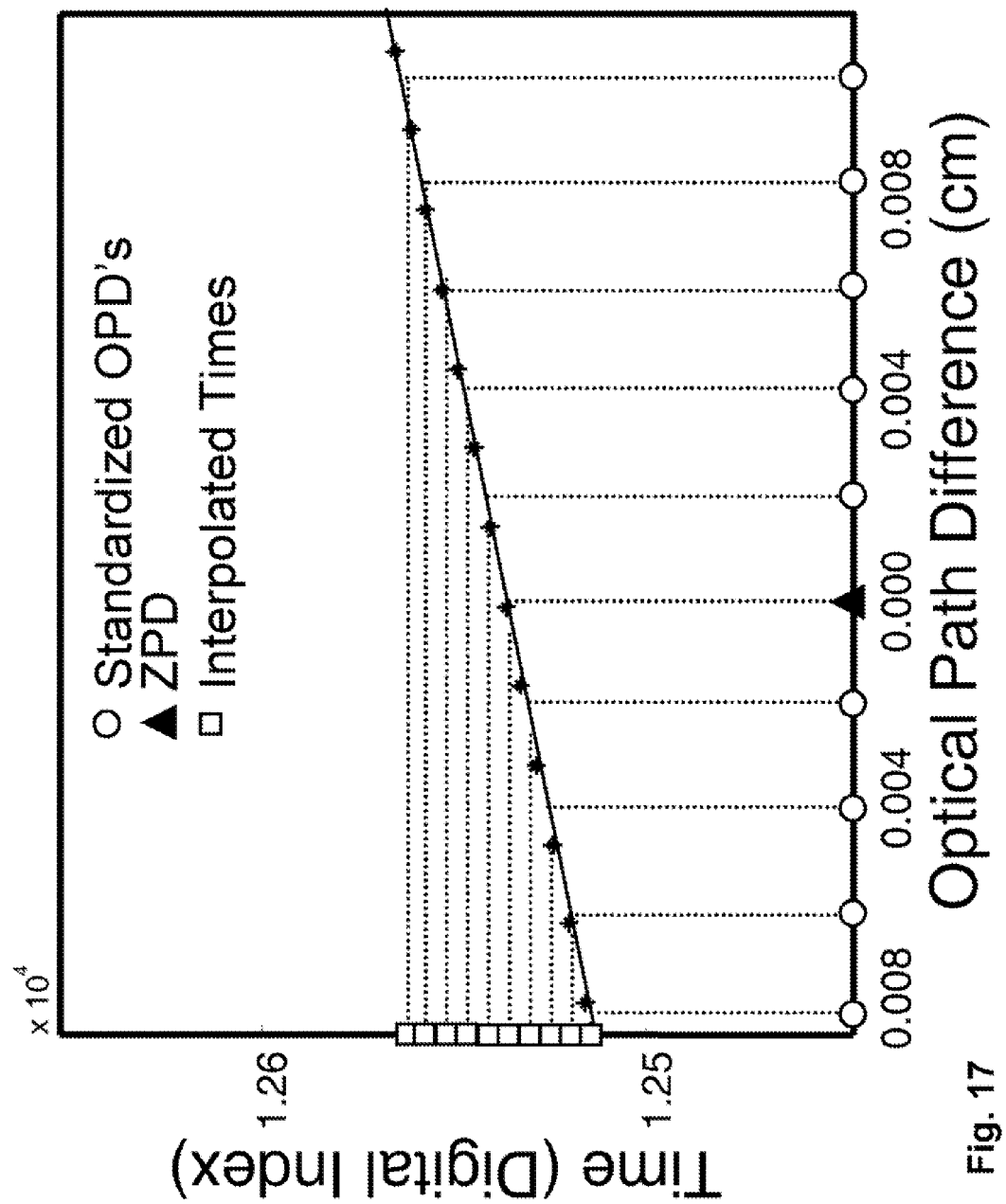
FIG. 17 is a schematic depiction of an example of $1^{st}$ step of wavenumber standardization using the previously defined map in order to determine the times corresponding to standardized optical path differences.

The location of zero path difference (ZPD) is located using the time corresponding to the maximum intensity in the spectroscopic channel which corresponds to the origin (zero point) of the OPD axis. The times corresponding to the standardized OPD's are then determined relative to the OPO origin by interpolating them from the defined map. FIG. 17 shows the standardization step that uses the OPO map obtained from the reference channel (where time zero is the time of ZPD) and the standard OPD locations to determine the desired times to interpolate from the spectroscopic channel. It is worthy to note that any constant delays remaining from step on can be accounted for in this step by shifting the origin of the time axis by the constant delay.

Figure 18:
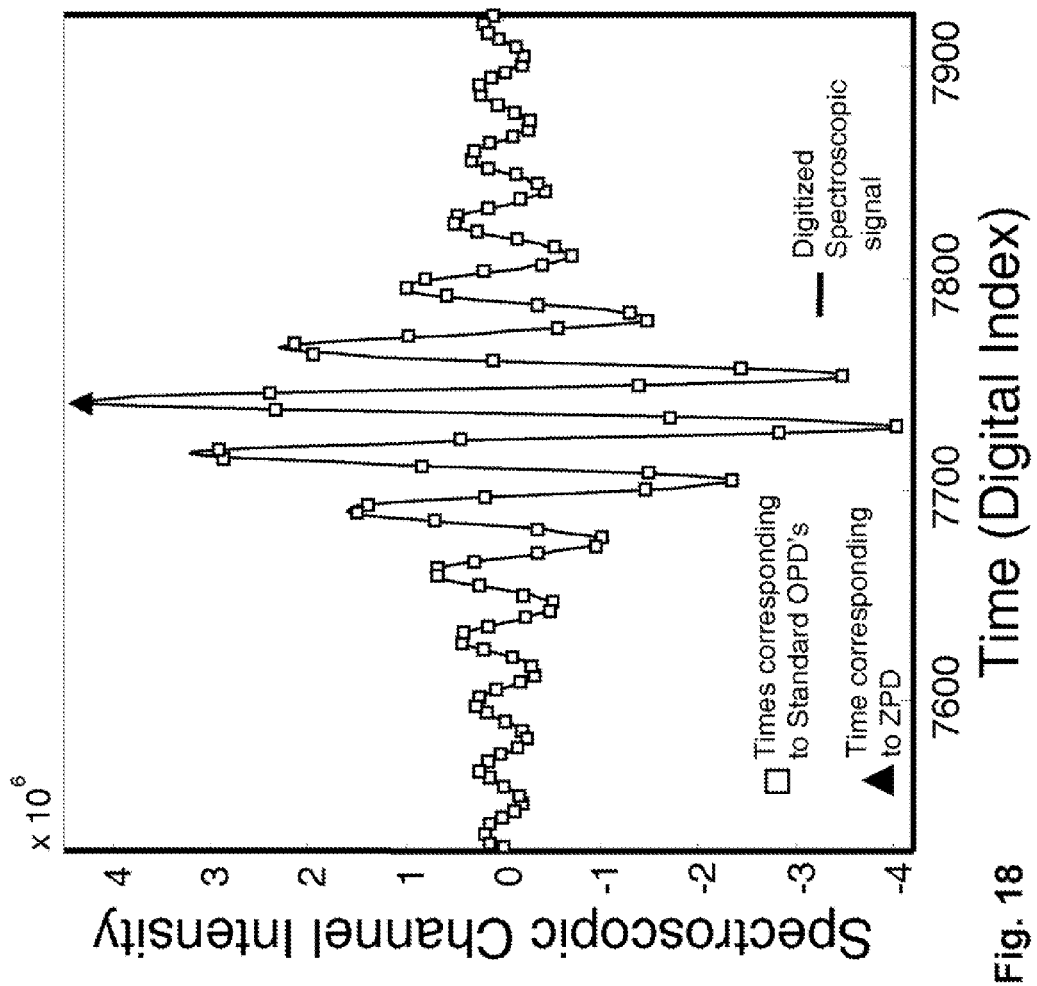
FIG. 18 is a schematic depiction of an example of $2^{nd}$ step of wavenumber standardization using the previously determined times corresponding to standardized optical path differences to interpolate the final spectroscopic interferogram intensities.

FIG. 18 shows the digitized and compensated spectroscopic signal and the times corresponding to the standardized OPD's determined from the step shown in FIG. 17. In an example embodiment, a cubic spline is used to interpolate the intensity corresponding to the times. As long as all sources of vibrational perturbation are captured in the reference channel OPD map (their frequencies are less than ½ the frequency of the zero crossings), any set of standard OPD's can be used as long as all spectroscopic devices under consideration use a consistent set. One aspect of the present invention is that the standard OPD's can have a closer spacing than the reference laser zero crossings (the interferogram is sampled more often), which is can be advantageous as it increases the Nyquist frequency of the interferogram. This approach preserves the photometric accuracy of the interferogram and subsequent spectra from each device and simultaneously standardizes the spectra of all devices to the same spectral wavelength locations which can be important in inter-instrument comparisons, multivariate analysis, and calibration transfer.

Experimental Results of an Embodiment of the Present Invention

The advantages of the present invention were demonstrated using a near-infrared spectrometer incorporating a Michelson interferometer operating at 32 $cm^{-1}$ resolution with a 4000 to 8000 $cm^{-1}$ wavenumber range of interest and a constant, spectroscopically stable input light source, and an integrating sphere (a spectroscopically inert sample placed in the spectroscopic light path). While this example used an integrating sphere, any sample could be used with the present invention. The term "sample" includes anything that the spectroscopic light interacts with prior to incidence at the spectroscopic photodetector. Some examples of suitable samples include a cuvette with aqueous or organic solutions, skin tissue measured in transmission or reflectance, emission sources such as stars (in this case the spectroscopic light source and sample are one and the same), gasses, or any other substance or object of interest.

The direct analog to digital converter output of the spectroscopic and reference channels was stored from a series of interferometer scans. The digitized channels were then processed to interferograms using two methods. The first method performed no frequency error compensation or OPD standardization. The zero-crossings of the reference signal were calculated using a cubic-spline interpolation and the intensities corresponding to those times were interpolated from the spectroscopic channel. This approach is commonly applied in the art and will be subsequently referred to as "Typical interferograms".

The second method for obtaining interferograms involved an embodiment of the present invention that incorporated frequency error compensation and OPD standardization. The frequency compensation filters were determined using the following process. The frequency responses of the spectroscopic channel was measured using a function generator connected to the output of the photodetector and spectrum analyzer connected to the input of a constant time sampling ADC thereby measuring the cumulative frequency response of the analog circuitry used to prepare the photo detector signal for digitization (see FIG. 8 for the resulting frequency response). This process was repeated for the reference channel.

The analog to digital converter incorporated an anti-aliasing decimation filter that could not be defeated. Consequently, the frequency response of this fitter was measured for inclusion in the compensation filter (see FIG. 12). The spectroscopic analog circuit response and decimation fitter It frequency response were combined, inverted, and multiplied by the response of a suitable band pass fitter (see FIG. 13) to form the target response of spectroscopic channel compensation filter. A 181 point compensation fitter for the spectroscopic channel was constructed using equation 2 and the target frequency response. A 181 point reference compensation filter was created using the same steps. The resulting compensation fitters and a comparison to the target responses are shown in FIGS. 14 and 15 respectively.

The frequency compensation fitters were then applied to their corresponding digitized data stream in order to compensate for the analog and ADC decimation filter response error and remove undesired frequencies from each channel. The times of the HeNe zero crossings of the resulting compensated/filtered reference signal were determined using recursive cubic-spline interpolation. The effective spacing of the HeNe zero-crossings was determined using a Xenon emission lamp as a wavelength calibration standard. The zero crossing times and effective spacing were used to create a map of OPD overtime for each scan (see FIG. 16 for an example). The time of ZPD was determined for each scan from the spectroscopic channel by finding the point of maximum intensity using recursive cubic spline interpolation. Each time was adjusted for the mean delay between the spectroscopic and reference channels that remained following compensation and then used to define the zero OPD location of the time vs. OPD map for that scan (see FIG. 17). The times corresponding to the predefined set of standard OPD's were then interpolated for each scan using its map using a cubic spline. Finally, the intensities of the spectroscopic channel at the resulting times were interpolated using a cubic spline (see FIG. 18). The resulting interferograms will be referred to as "Standardized interferograms".

Figure 19:
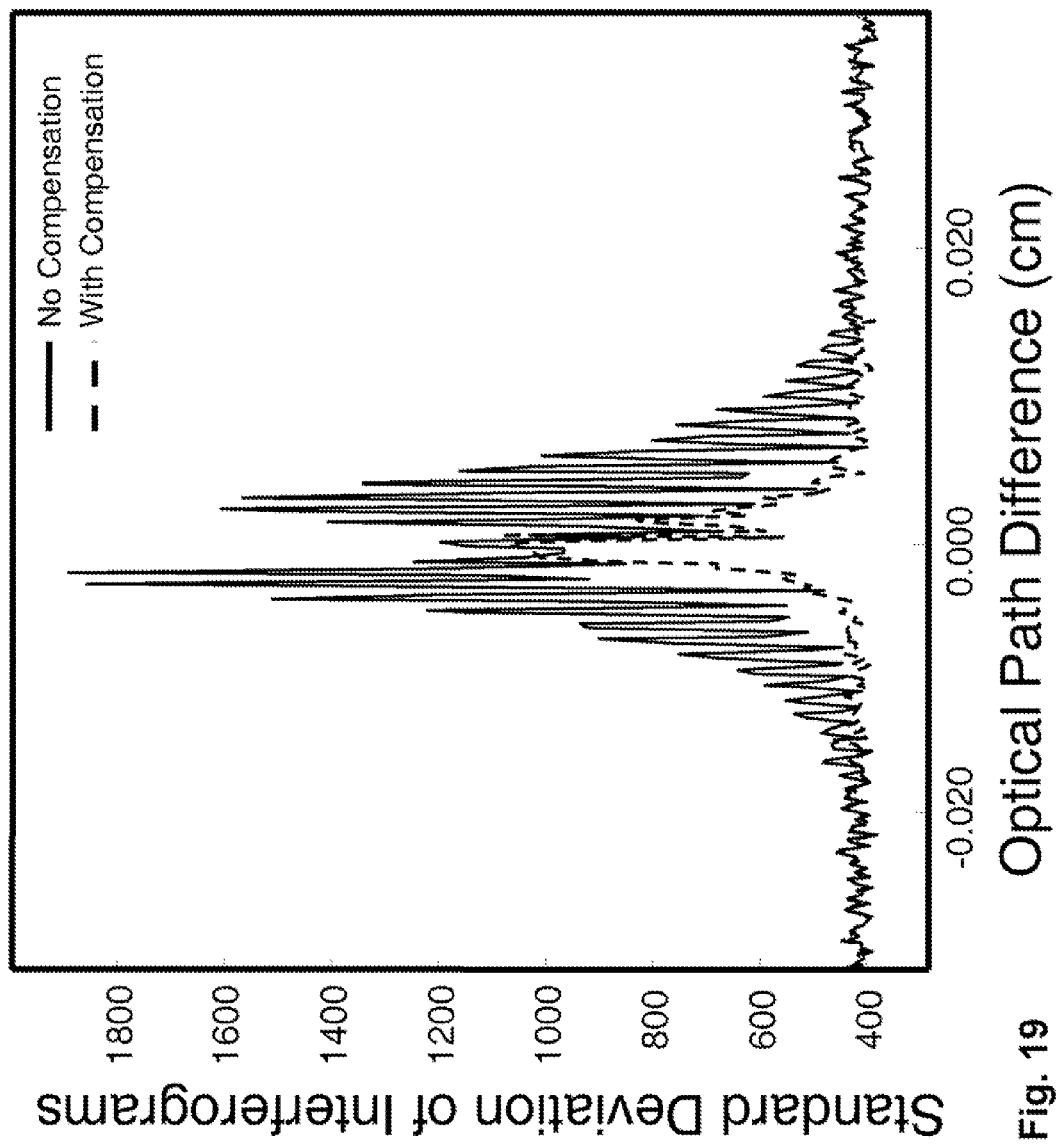
FIG. 19 is a schematic depiction of an example of the interferogram signal to noise benefit of the present invention.
Figure 20:
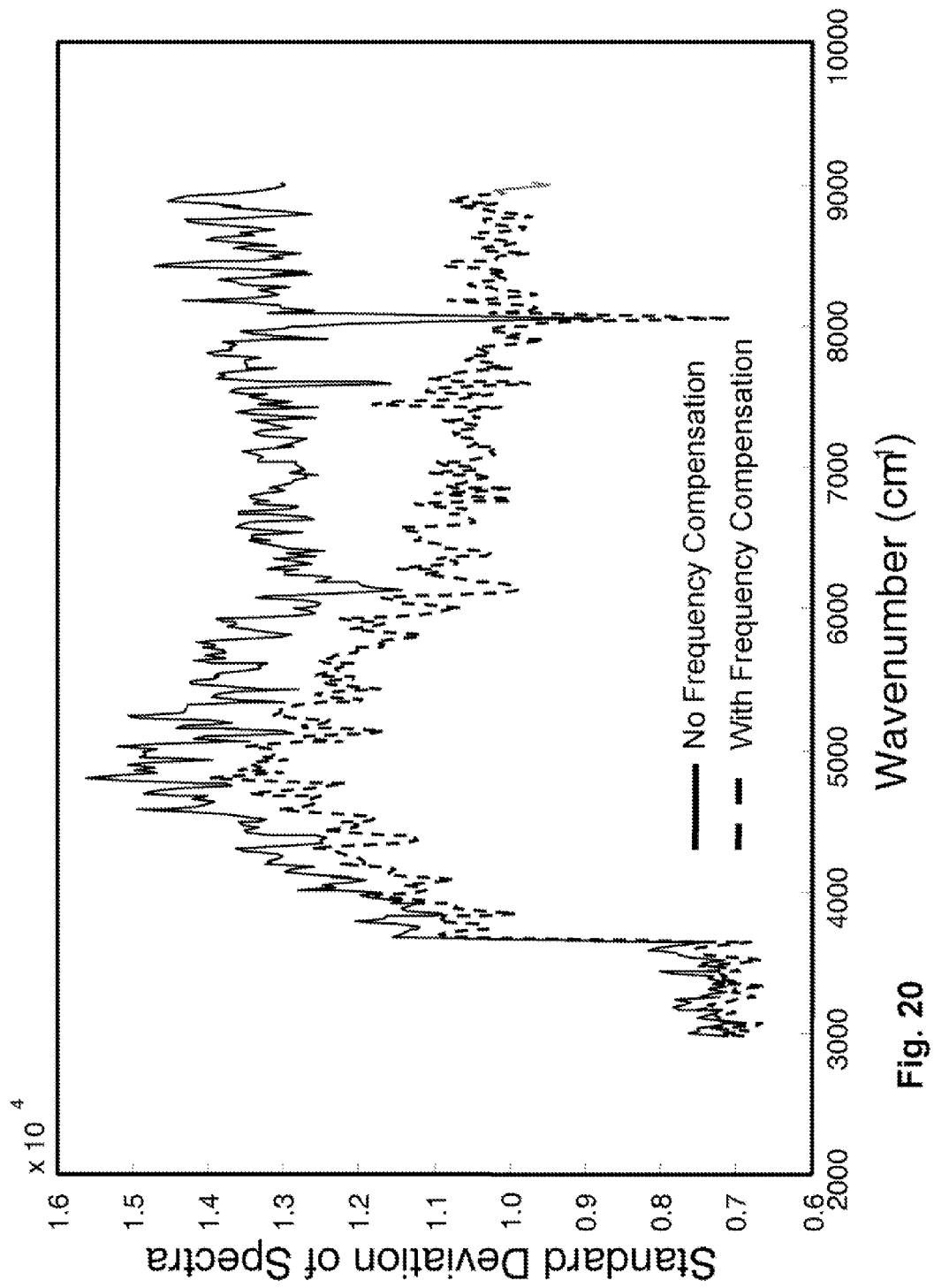
FIG. 20 is a schematic depiction of experimental results demonstrating the spectral signal to noise advantage of the present invention—note that the wavenumber locations of the spectral data points will be consistent for all devices employing the standardization method and identical standard OPDs.
Figure 21:
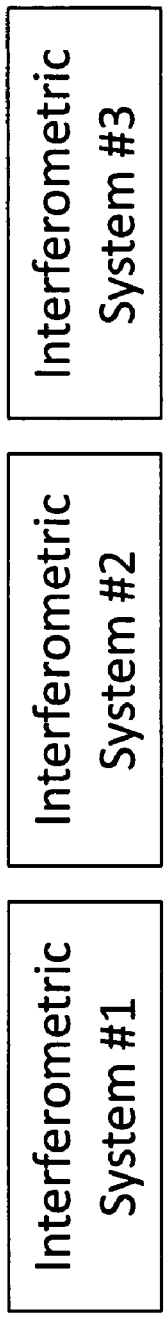
FIG. 21 is a schematic illustration of multiple interferometric systems as mentioned in the paragraphs below.
Figure 22:
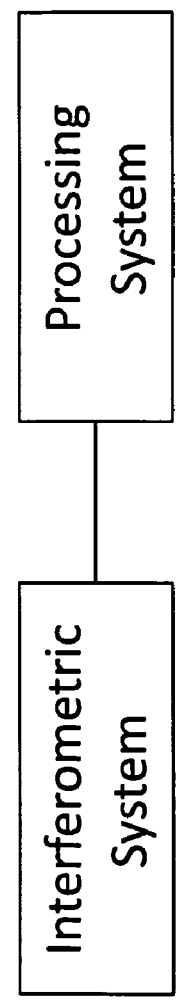
FIG. 22 is a schematic illustration of an interferometric system according an example embodiment of the present invention.

FIG. 19 shows the standard deviation of the "Typical" and "Standardized" interferograms as a function of optical path difference which shows a marked difference between the methods despite the fact that both started with the same digitized spectroscopic and reference data. The standard deviation of the "Standardized" interferograms is considerably lower than the "Typical" interferograms which is indicative that the present invention generates more precise, reproducible interferograms. FIG. 20 shows the standard deviation as a function of wavenumber for the spectra obtained by Fourier Transformation of the "Typical" and "Standardized" interferograms which shows that the improved precision is maintained in the spectroscopic domain.

The particular sizes, steps, and equipment discussed above are cited merely to illustrate particular embodiments of the invention. It is contemplated that the use of the invention can involve components and steps having different sizes and characteristics. It is intended that the scope of the invention be defined by the claims appended hereto.

What is claimed is:

1. A method of producing an interferogram from a reference signal and a spectroscopic signal obtained from a spectroscopic instrument, comprising:
   (a) determining from a plurality of measurements of a digital reference signal, each taken at one of a plurality of different times, a functional relationship that relates optical path difference and time over a set of times that are between the times of at least two of the measurements in the plurality of measurements of the digital reference signal;
   (b) determining from the functional relationship one or more times that correspond to a predetermined set of optical path differences; and
   (c) determining the value of the spectroscopic signal at the determined times to produce the interferogram.

2. A method as in claim 1, wherein determining a functional relationship comprises determining optical path difference as a function of time, where the function is continuous over the range of optical path differences in the predetermined set.

3. A method as in claim 2, wherein the functional relationship is determined using at least one of a spline, polynomial, sinc, Savitzky-Golay or combination thereof.

4. A method as in claim 1, wherein the optical path differences in the predetermined set have consistent spacing between optical path differences.

5. A method of producing interferograms on a plurality of interferometric systems, comprising, on each interferometric system,
   (a) Acquiring a reference signal and a spectroscopic signal;
   (b) Determining an interferogram using the method of claim 1, with the predetermined set of optical path differences the same for the application of claim 1 to each interferometric system.

6. A method as in claim 1, wherein the predetermined set of optical path differences contains at least one optical path difference that does not correspond to a zero crossing of the reference signal.

7. A method of determining an interferogram using a spectroscopic instrument, comprising
   (a) determining a reference signal by:
      (i) providing an effectively monochromatic light source;
      (ii) modulating light from the effectively monochromatic light source using an interferometric system;
      (iii) detecting the output of the interferometric system as an analog signal using a reference photodetector; and
      (iv) converting the analog signal to a digital reference signal;
   (b) determining a spectroscopic signal by;
      (i) providing a light source;
      (ii) providing a sample such that light from the light source interacts with the sample;
      (iii) modulating light after interaction with the sample using the interferometric system;
      (iv) detecting the output of the interferometric system as an analog signal using a spectroscopic photodetector; and
      (v) converting the analog signal to a digital spectroscopic signal; and
   (c) determining an interferogram using the method of claim 1.

8. A method as in claim 7, wherein the reference photodetector and the spectroscopic photodetector comprise a single photodetector apparatus.

9. A method as in claim 7, wherein the interferometric system comprises a single interferometer.

10. A method as in claim 7, wherein the interferometric system comprises a plurality of interferometers having at least one common optical component.

11. A method as in claim 7, wherein the spectroscopic light interacts with the sample due to at least one of atomic or molecular absorption, atomic or molecular emission, Raman scattering, fluorescence, phosphorescence.

12. A method as in claim 7, wherein the sample is the light source.

13. A method as in claim 1, wherein the reference signal is generated at least in part using electronic circuit components, wherein the method further comprises compensating the reference signal for frequency distortions caused by the electronic circuit components.

14. A method as in claim 13, wherein the compensation is a uniform time delay for a plurality of frequencies in the reference signal.

15. The method as in claim 13 wherein the compensation is achieved using a digital filter whose frequency response is substantially the inverse of the response distortions in the reference signal.

16. The method as in claim 13 wherein the compensation is achieved using a combination of (a) a uniform time delay for a plurality of frequencies in the reference signal and (b) a digital filter whose frequency response is substantially the inverse of the response distortions in the reference signal.

17. A method as in claim 1, wherein the spectroscopic signal is generated at least in part using electronic circuit components, wherein the method further comprises compensating the spectroscopic signal for frequency distortions caused by the electronic circuit components.

18. A method as in claim 17, wherein the compensation is a uniform time delay for a plurality of frequencies in the spectroscopic signal.

19. The method as in claim 17 wherein the compensation is achieved using a digital filter whose frequency response is substantially the inverse of the response distortions in the spectroscopic signal.

20. The method as in claim 17 wherein the compensation is achieved using a combination of (a) a uniform time delay for a plurality of frequencies in the spectroscopic signal and (b) a digital filter whose frequency response is substantially the inverse of the response distortions in the spectroscopic signal.

21. A spectroscopic apparatus, comprising:
(a) an interferometric system, configured to produce a digitized reference signal and a spectroscopic signal, wherein the reference signal comprises reference values each paired with a corresponding measurement time; and configured to produce a digitized spectroscopic signal, wherein the spectroscopic signal comprises spectroscopic values each paired with a corresponding measurement time; and
(b) a processing system, configured to produce an interferogram according to the method of claim 1.

22. A method of determining a property of a sample using a second interferometric system and a model relating the property to an interferogram determined on a first interferometric system, comprising, on the second interferometric system:
(a) Acquiring a reference signal and a spectroscopic signal;
(b) Determining an interferogram using the method of claim 1, with the predetermined set of optical path differences the same for the application of claim 1 as the set of optical path differences used in generating an interferogram from the first interferometric system used in generating the model.

23. A method as in claim 1, wherein step (a) comprises interpolation of optical path difference at one or more times between the times of at least two of the measurements in the plurality of measurements of the digital reference signal.

24. A method of producing an interferogram from a reference signal and a spectroscopic signal obtained from a spectroscopic instrument, comprising:
(a) storing a plurality of measurements of a digital reference signal, each taken at one of a plurality of different times;
(b) determining from the stored plurality of measurements a functional relationship that relates optical path difference and time over a set of times that are between the times of at least two of the stored measurements;
(c) determining from the functional relationship one or more times that correspond to a predetermined set of optical path differences; and
(d) determining the value of the spectroscopic signal at the determined times to produce the interferogram.

25. A method as in claim 24, wherein at least one of the predetermined optical path differences is an optical path difference of zero.

26. A spectroscopic apparatus, comprising:
(a) an interferometric system, configured to produce a digitized reference signal and a spectroscopic signal, wherein the reference signal comprises reference values each paired with a corresponding measurement time; and configured to produce a digitized spectroscopic signal, wherein the spectroscopic signal comprises spectroscopic values each paired with a corresponding measurement time; and
(b) a processing system, configured to produce an interferogram according to the method of claim 24.

27. A method as in claim 24, wherein step (b) comprises interpolation of optical path difference at one or more times between the times of at least two of the stored measurements.

* * * * *